US012568555B2

(12) United States Patent (10) Patent No.: US 12,568,555 B2
Nayak et al. (45) Date of Patent: Mar. 3, 2026

(54) METHOD AND APPARATUS FOR BSS TRANSITION SUPPORT FOR EPCS

(71) Applicant: Samsung Electronics Co., Ltd., Suwon-si (KR)

(72) Inventors: Peshal Nayak, Plano, TX (US); Rubayet Shafin, Allen, TX (US); Boon Loong Ng, Plano, TX (US); Vishnu Vardhan Ratnam, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 403 days.

(21) Appl. No.: 18/356,722

(22) Filed: Jul. 21, 2023

(65) Prior Publication Data

US 2024/0040663 A1 Feb. 1, 2024

Related U.S. Application Data

(60) Provisional application No. 63/465,982, filed on May 12, 2023, provisional application No. 63/498,254, (Continued)

(51) Int. Cl.
*H04W 4/00* (2018.01)
*H04W 72/56* (2023.01)
*H04W 76/50* (2018.01)

(52) U.S. Cl.
CPC ........... *H04W 76/50* (2018.02); *H04W 72/56* (2023.01)

(58) Field of Classification Search
CPC ..... H04W 76/50; H04W 72/56; H04W 76/15; H04W 84/12
See application file for complete search history.

(56) References Cited

U.S. PATENT DOCUMENTS

2021/0144778 A1 5/2021 Cherian et al.
2021/0392494 A1 12/2021 Huang et al.
(Continued)

FOREIGN PATENT DOCUMENTS

KR 10-2013-0003022 A 1/2013
WO 2022015502 A1 1/2022

OTHER PUBLICATIONS

IEEE P802.11be—D2.0; Draft Standard for Information technology—Telecommunications and information exchange between systems Local and metropolitan area networks—Specific requirements; "Part 11: Wireless LAN Medium Access Control (MAC) and Physical Layer (PHY) Specifications—Amendment 8: Enhancements for extremely high throughput (EHT)" May 2022, 873 pages.
IEEE Standards Association; IEEE Std 802.11-2020; IEEE Standard for Information Technology—Telecommunications and Information Exchange between Systems—Local and Metropolitan Area Networks—Specific Requirements; "Part 11: Wireless LAN Medium Access Control (MAC) and Physical Layer (PHY) Specifications"; Dec. 3, 2020; 4379 pages.
(Continued)

*Primary Examiner* — Omoniyi Obayanju

(57) ABSTRACT

Methods and apparatuses for prioritization handling for EPCS operation are disclosed. A method for wireless communication performed by a non-AP device that comprises a STA comprises: forming a first link with a first AP of a first AP MLD and a second link with a second AP of a second AP MLD; receiving information associated with EPCS priority access from the first and second APs, determining whether the STA is undergoing a BSS transition from the first AP to the second AP; when the STA is not undergoing the BSS transition from the first AP to the second AP, continuing with a current EPCS priority access; and when the STA is undergoing the BSS transition from the first AP to the second AP, determining a procedure for handling the EPCS priority access associated with the BSS transition from the first AP to the second AP.

20 Claims, 12 Drawing Sheets

Related U.S. Application Data filed on Apr. 25, 2023, provisional application No. 63/395,602, filed on Aug. 5, 2022, provisional application No. 63/394,196, filed on Aug. 1, 2022.

(56) References Cited

U.S. PATENT DOCUMENTS

2023/0171818 A1* 6/2023 Cherian .................. H04W 4/90
                                                370/329
2024/0137822 A1* 4/2024 Zhou ..................... H04W 36/08

OTHER PUBLICATIONS

International Search Report and Written Opinion issued Oct. 31, 2023, regarding International Application No. PCT/KR2023/010987, 9 pages.
Das et al., "Multimedia Priority Service over Wi-Fi Networks", IEEE Communications Standards Magazine, vol. 6, No. 2, Jun. 2022, pp. 28-34.
Extended European Search Report issued Apr. 16, 2025 regarding Application No. 23850351.0, 8 pages.
Wullert et al., "Resolution of EPCS-related CIDs in clause 4.5.13 (CC 266)", IEEE 802.11-22-1015r0, Jul. 2022, 6 pages.

* cited by examiner

500

Originator requests EPCS priority access from target AP MLD/AP upon BSS transition — 502

Target AP MLD/AP able to provide authorization immediately? — 504

No

Transmit a response with response code indicating delayed EPCS authorization — 506

Yes

Transmit a response code indicating successful authorization — 508

600

AP receives an ML disassociation frame from an STA ⟋602

STA's EPCS priority access is enabled? ⟋604

No → No action needed ⟋606

Yes

Change EPCS priority access status to torn down ⟋608

*700*

*702*

Originator to undergo BSS transition?

No → *704*

No action needed

Yes

*706*

Originator has ECPS priority access enabled?

No → *708*

No action needed

Yes

Either originator or current AP can use BSS fast transition procedure

*710*

900

| Fast BSS transition over DS | Resource request protocol capability | EPCS authorized | Reserved |
|---|---|---|---|

Bits:

1000

| Element ID | Length | Modified extended RSN capabilities |
|---|---|---|

Octets:      1      1      n

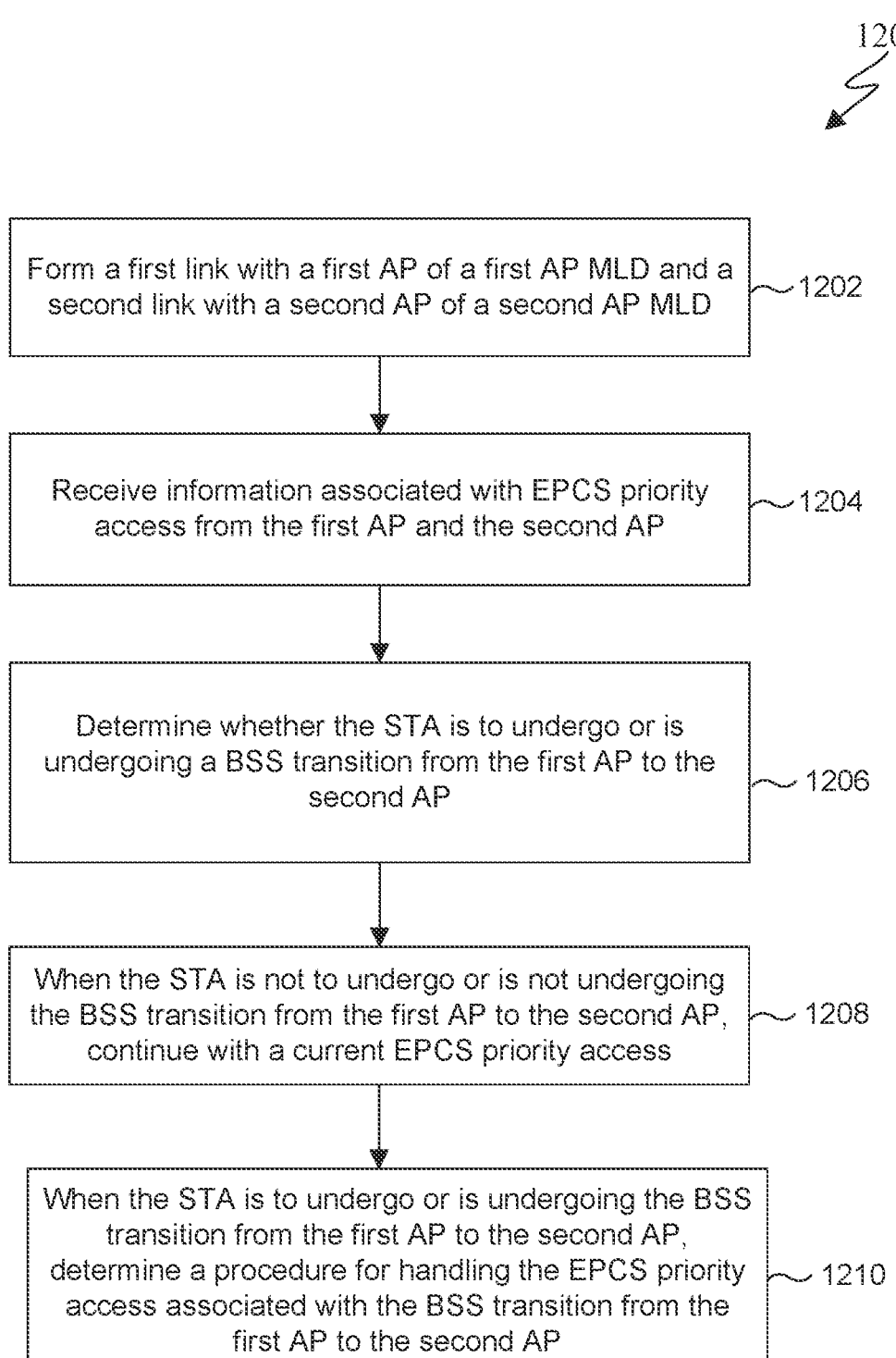

1200

Form a first link with a first AP of a first AP MLD and a second link with a second AP of a second AP MLD ~1202

Receive information associated with EPCS priority access from the first AP and the second AP ~1204

Determine whether the STA is to undergo or is undergoing a BSS transition from the first AP to the second AP ~1206

When the STA is not to undergo or is not undergoing the BSS transition from the first AP to the second AP, continue with a current EPCS priority access ~1208

When the STA is to undergo or is undergoing the BSS transition from the first AP to the second AP, determine a procedure for handling the EPCS priority access associated with the BSS transition from the first AP to the second AP ~1210

FIG. 12

METHOD AND APPARATUS FOR BSS TRANSITION SUPPORT FOR EPCS

CROSS-REFERENCE TO RELATED APPLICATION AND CLAIM OF PRIORITY

This application claims priority under 35 U.S.C. § 119(e) to U.S. Provisional Patent Application No. 63/394,196 filed on Aug. 1, 2022; U.S. Provisional Patent Application No. 63/395,602 filed on Aug. 5, 2022; U.S. Provisional Patent Application No. 63/498,254 filed on Apr. 25, 2023; and U.S. Provisional Patent Application No. 63/465,982 filed on May 12, 2023, which are hereby incorporated by reference in their entireties.

TECHNICAL FIELD

This disclosure relates generally to transmission efficiency in wireless communications systems that include multi-link devices. Embodiments of this disclosure relate to methods and apparatuses for basic service set (BSS) transition support for emergency preparedness communication services (EPCS) operation.

BACKGROUND

Wireless local area network (WLAN) technology allows devices to access the internet in the 2.4 GHz, 5 GHz, 6 GHz, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Multi-link operation (MLO) is a feature that is currently being developed by the standards body for next generation extremely high throughput (EHT) Wi-Fi systems in IEEE 802.11be. The Wi-Fi devices that support MLO are referred to as multi-link devices (MLD). With MLO, it is possible for a non-access point (AP) multi-link device (MLD) to discover, authenticate, associate, and set up multiple links with an AP MLD. Channel access and frame exchange is possible on each link between the AP MLD and non-AP MLD.

SUMMARY

Embodiments of the present disclosure provide methods and apparatuses for BSS transition support for EPCS operation.

In one embodiment, a non-AP device is provided, comprising: a station (STA) comprising a transceiver configured to: form a first link with a first AP of a first AP MLD and a second link with a second AP of a second AP MLD; and receive information associated with emergency preparedness communication services (EPCS) priority access from the first AP and the second AP, wherein the STA supports the EPCS priority access. The non-AP device further comprises a processor operably coupled to the STA, the processor configured to: determine whether the STA is to undergo or is undergoing a basic service set (BSS) transition from the first AP to the second AP; when the STA is not to undergo or is not undergoing the BSS transition from the first AP to the second AP, continue with a current EPCS priority access; and when the STA is to undergo or is undergoing the BSS transition from the first AP to the second AP, determine a procedure for handling the EPCS priority access associated with the BSS transition from the first AP to the second AP.

In another embodiment, an AP device is provided, comprising: a transceiver configured to: form a first link with a STA; and receive information associated with EPCS priority access from the STA, wherein the STA supports the EPCS priority access. The AP device further comprises a processor operably coupled to the transceiver, the processor configured to: determine whether the STA is to undergo or is undergoing a BSS transition to the AP; when the STA is not to undergo or is not undergoing the BSS transition to the AP, continue with a current EPCS priority access; and when the STA is to undergo or is undergoing the BSS transition to AP, determine a procedure for handling the EPCS priority access associated with the BSS transition to the AP.

In yet another embodiment, a method for wireless communication performed by a non-AP device that comprises a STA comprises: forming a first link with a first AP of a first AP MLD and a second link with a second AP of a second AP MLD; receiving information associated with EPCS priority access from the first AP and the second AP, wherein the STA supports the EPCS priority access; determining whether the STA is to undergo or is undergoing a BSS transition from the first AP to the second AP; when the STA is not to undergo or is not undergoing the BSS transition from the first AP to the second AP, continuing with a current EPCS priority access; and when the STA is to undergo or is undergoing the BSS transition from the first AP to the second AP, determining a procedure for handling the EPCS priority access associated with the BSS transition from the first AP to the second AP.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 12 illustrates an example of a method for wireless communication performed by a non-AP device according to embodiments of the present disclosure.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: [1] IEEE P802.11be/D2.0, 2022 and [2] IEEE std. 802.11-2020.

Embodiments of the present disclosure provide mechanisms for BSS transition support for EPCS operation.

Figure 1:
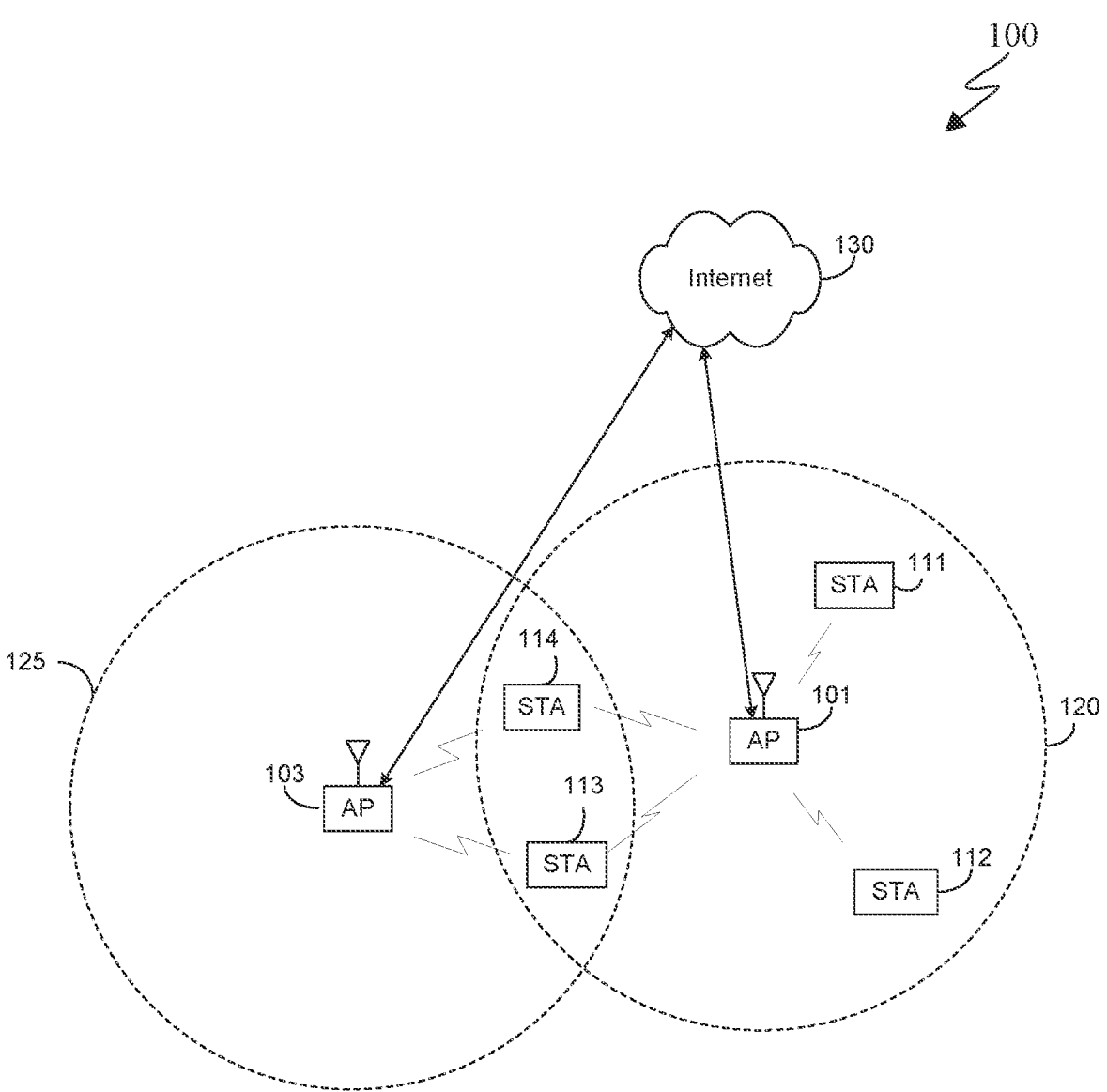
FIG. 1 illustrates an example wireless network according to embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for traffic urgency indication. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
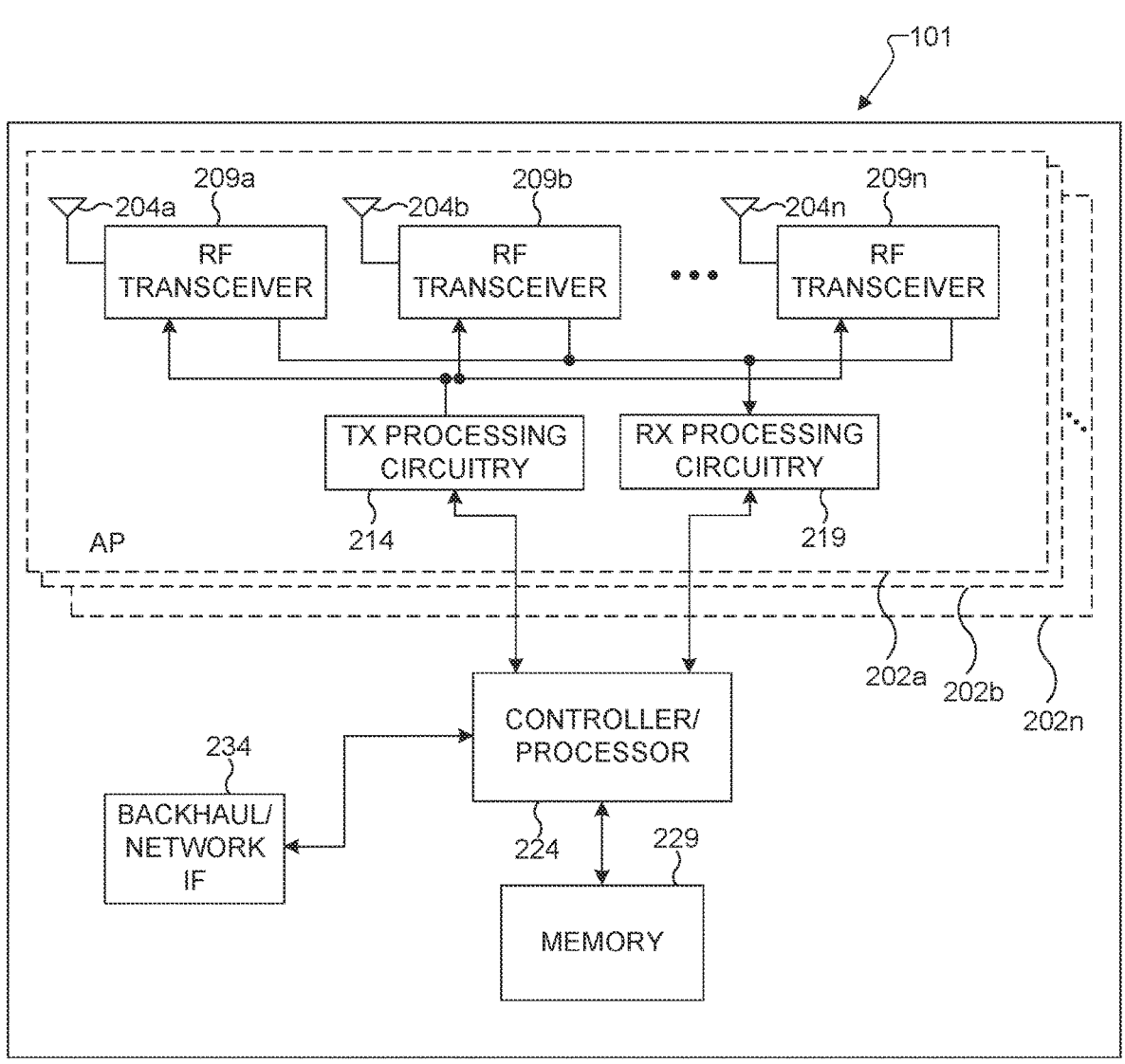
FIG. 2A illustrates an example AP according to embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including BSS transition support for EPCS operation. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for BSS transition support for EPCS operation. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
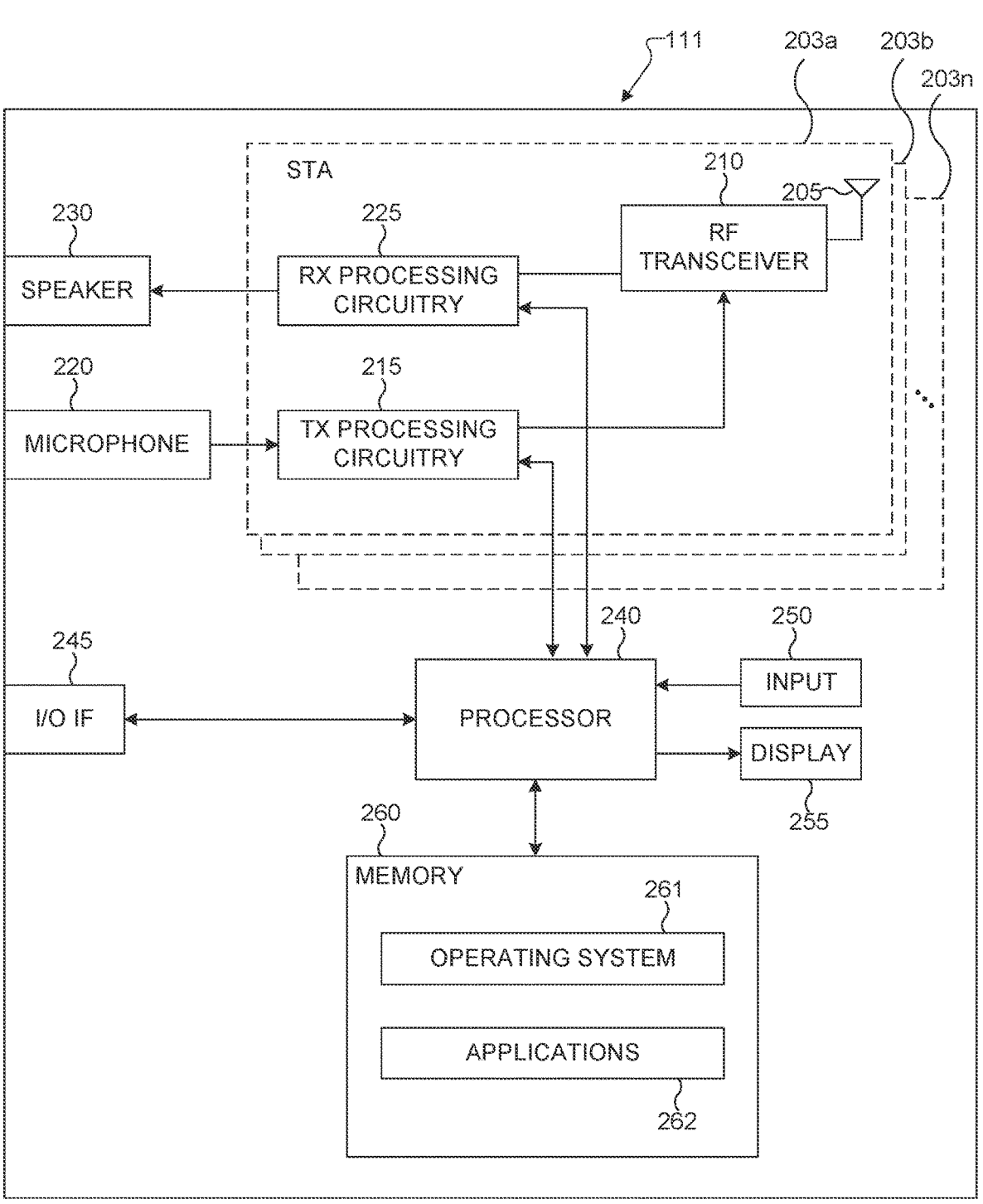
FIG. 2B illustrates an example STA according to embodiments of the present disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA 1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to support BSS transition for EPCS operation. In some embodiments, the controller/processor 240 includes at least one microprocessor or microcontroller.

The controller/processor 240 is also capable of executing other processes and programs resident in the memory 260, such as operations for supporting BSS transition for EPCS operation. The controller/processor 240 can move data into or out of the memory 260 as required by an executing process. In some embodiments, the controller/processor 240 is configured to execute a plurality of applications 262, such as applications for supporting BSS transition for EPCS operation. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

Emergency telecommunication services have been implemented in a number of countries with the objective of providing prioritized access in the times of disasters or emergencies. Examples of such telecommunication services in the united states include government emergency telecommunication service (GETS), wireless priority service (WPS), next generation network priority services (NGN priority services), telecommunications service priority (TSP), etc. Such services have also been implemented in other countries. Examples of such services include blue light mobile service in Belgium, mobile telecommunications privileged access scheme in Great Britain, disaster priority telephone in Japan, etc. Typically, such services are subscription based, operator controlled, enabled through global standards and are offered over commercial network infrastructure.

In recent times there has been a growing need for such services over Wi-Fi networks. In IEEE 802.11be, Emergency preparedness communication services (EPCS) has been introduced with the goal of providing prioritized access to certain authorized users. As a part of this service, the user that has associated with an AP can be authorized by the AP to take advantage of EPCS service. Once authorized, the user can use an enhanced EDCA parameter set with values for parameters such as CWmin[AC], CWmax[AC], AIFSN [AC], TXOP[AC], etc. which are different from those for other STAs associated with the same AP. With this enhanced EDCA parameter set, the non-AP MLD that is authorized by the AP, benefits from prioritized access as it can capture the channel faster compared to other users in the network. After EPCS is disabled, the non-AP MLD can update its EDCA parameter set to match that of other non-EPCS users in the network.

Fast BSS Transition is a procedure defined in [2] to enable an STA to undergo smooth BSS transition while being able to transfer resources setup in the previous BSS. Currently, the spec supports only certain types of resources/setups (Block ACK setup and TSPEC setups) to be transferred from one BSS to another by using the Fast BSS Transition procedure. Other types of resources/setup transfers are not supported.

Various embodiments of the present disclosure recognize that a non-AP MLD that is EPCS authorized or capable of receiving EPCS authorization may want to transition from a first AP MLD (e.g., AP MLD1) to a different AP MLD (e.g., AP MLD2) for various reasons, and that when a BSS transition occurs as described above, there is a need for a procedure for handling EPCS priority access support. This will enable an EPCS enabled/capable non-AP MLD/non-AP STA to undergo smooth BSS transition.

Accordingly, various embodiments of the present disclosure provide mechanisms for handling EPCS priority access when a non-AP MLD or non-AP STA undergoes BSS transition.

Figure 3:
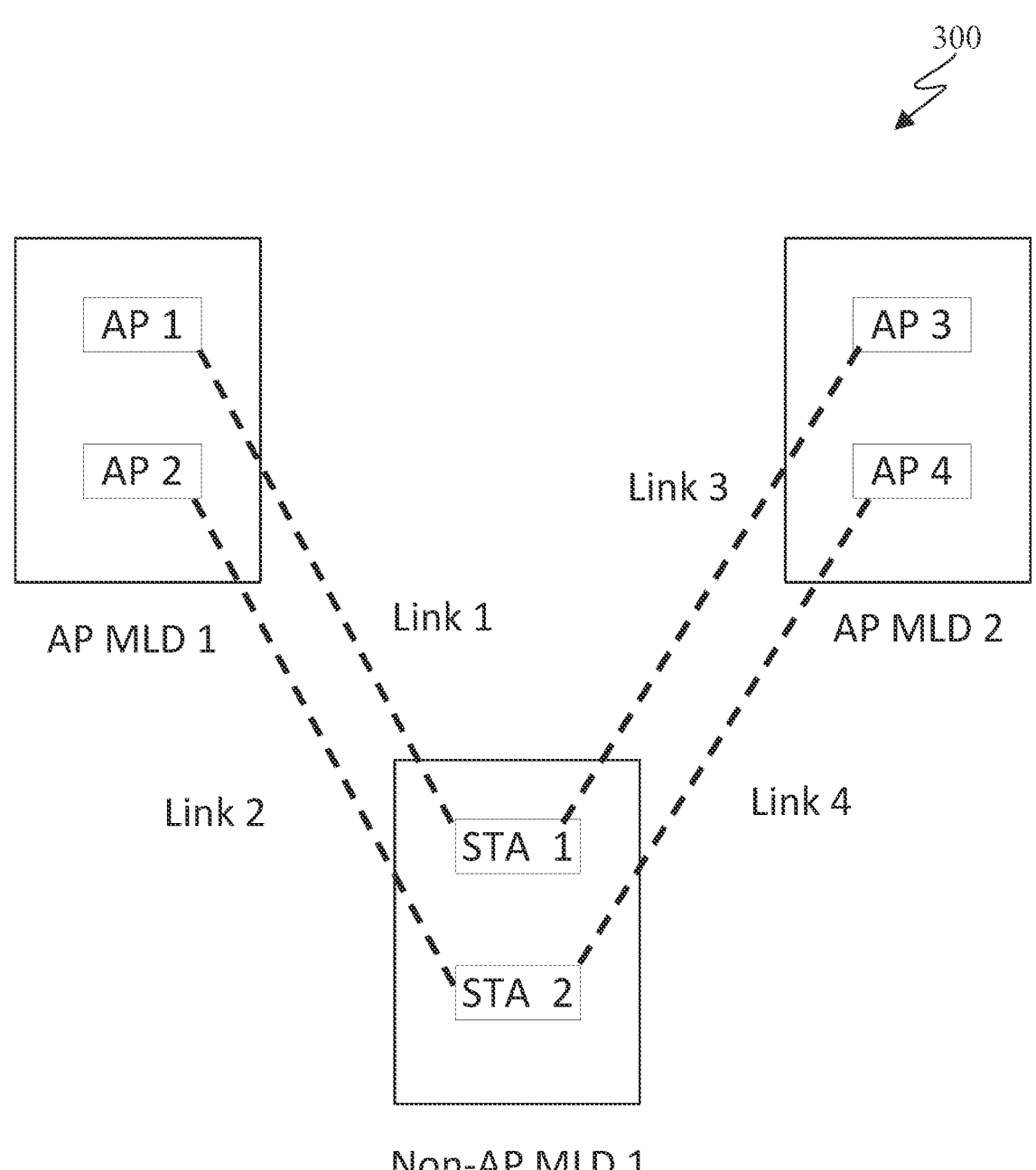
FIG. 3 illustrates an example AP transition scenario according to embodiments of the present disclosure.

FIG. 3 illustrates an example of an AP transition scenario 300 according to embodiments of the present disclosure. The embodiment of the example AP transition scenario 300 shown in FIG. 3 is for illustration only. Other embodiments of the example AP transition scenario 300 could be used without departing from the scope of this disclosure.

Consider a scenario as illustrated in FIG. 3. AP1 and AP2 are two AP STAs affiliated with AP MLD1. AP3 and AP4 are two AP STAs affiliated with AP MLD2. STA1 and STA2 are two non-AP STAs affiliated with non-AP MLD1. STA1 and STA2 affiliated with non-AP MLD1 form two links—link1 and link2 with AP1 and AP2 respectively. Due to a number of reasons non-AP MLD1 may want to transition from AP MLD1 to a different AP MLD (AP MLD2 in this example). For instance, due to mobility, non-AP MLD1 may be in the range of two AP MLDs—AP MLD1 and AP MLD2 and non-AP MLD1 may want to transition from AP MLD1 to AP MLD2 and form links—link 3 between STA1 and AP3 and link 4 between STA2 and AP4. The reason for switching from one AP MLD to another could be many. One example is availability of links with better signal strength.

As used in the present disclosure, an originator is defined as a non-AP MLD/non-AP STA that is undergoing BSS transition. A current AP MLD/AP is defined as an AP MLD/AP that the originator is currently associated with. A target AP MLD/AP is defined as the AP MLD or the AP that the originator intends to transition to. The originator can be a device that is capable of obtaining EPCS authorization. Based on this terminology, in the example illustrated in FIG. 3, non-AP MLD1 can be referred to as the originator. Further, AP MLD1 can be referred to as the current AP MLD and the AP MLD2 can be referred to as the target AP MLD.

According to one embodiment, an AP MLD/AP can locally cache EPCS authorization information. This information can include but is not limited to any previous EPCS authorization that the AP MLD/AP may have performed for the originator (e.g., authorization information present in dot11InterworkingEntry from the dot11InterworkingTable). As the originator undergoes BSS transition and (re)associates with the target AP MLD/AP, the target AP MLD/AP can use the locally cached information to authorize the EPCS device during association/reassociation procedures. This is applicable for all the scenarios and cases described in this disclosure. Further, the AP MLD/AP can also send/exchange this information in a frame transmitted to other AP MLD (s)/AP(s) and those AP MLD(s)/AP(s) can also cache this information and use it for EPCS authorization purposes when the originator (re)associates with them.

In one scenario, the current AP MLD/AP and target AP MLD/AP cannot communicate with each other. For example, the current AP MLD/AP and target AP MLD/AP are not a part of the same extended service set (ESS) or are out of range from each other.

In one example, EPCS priority access is already setup prior to BSS transition.

Figure 4:
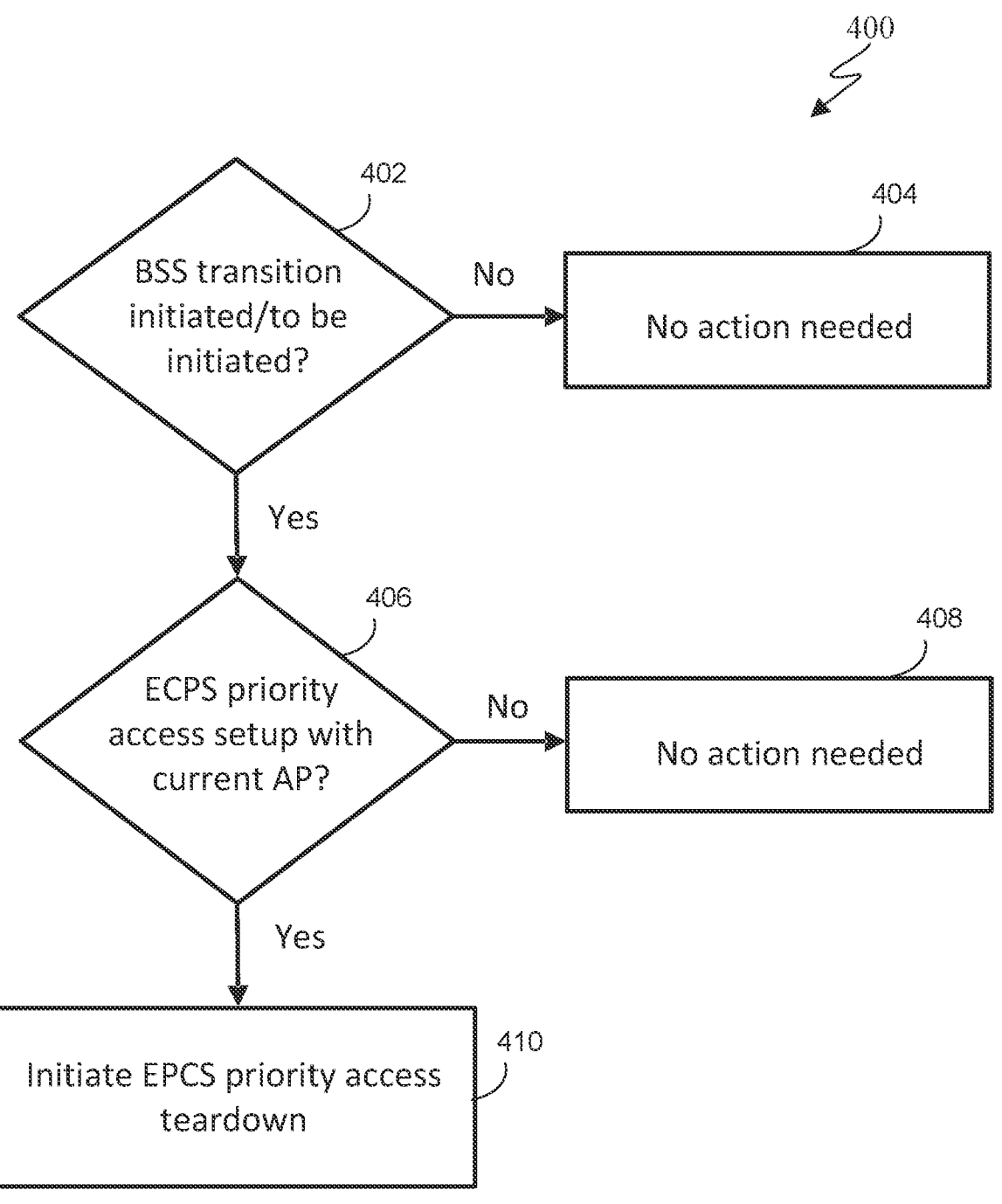
FIG. 4 illustrates an example method for EPCS priority access teardown for BSS transition according to embodiments of the present disclosure.

FIG. 4 illustrates an example method 400 for EPCS priority access teardown for BSS transition according to embodiments of the present disclosure. The embodiment of the example method 400 for EPCS priority access teardown for BSS transition shown in FIG. 4 is for illustration only. Other embodiments of the example method 400 for EPCS priority access teardown for BSS transition could be used without departing from the scope of this disclosure.

As illustrated in FIG. 4, the method 400 begins at step 402, where a determination is made whether a BSS transition is initiated or is to be initiated. If a BSS transition is not initiated or is not to be initiated, then at step 404, no action is needed. If a BSS transition is initiated or is to be initiated, then at step 406, a determination is made whether EPCS priority access is setup with the current AP. If EPCS priority access is not setup with the current AP, then at step 408, no action is needed. If EPCS priority access is setup with the current AP, then at step 410, EPCS priority access teardown is initiated.

According to one embodiment, the originator can tear down its EPCS priority access authorization with the current AP MLD/AP. According to this embodiment, the originator can transmit a tear down request to the current AP MLD/AP. For instance, this termination request can be made by transmission of an EPCS Priority Access Teardown frame.

Further, according to this embodiment, the originator can setup the EPCS authorization with the target AP MLD/AP by making a request to enable EPCS priority access. For instance, this EPCS authorization can be made by transmission of an EPCS Priority Access Enable Request frame from the originator to the target AP MLD/AP. Upon receiving authorization from the target AP MLD/AP, the originator can then resume its EPCS priority access.

In another embodiment, upon detection of a BSS transition, the current AP MLD/AP can initiate the EPCS priority access teardown and can transmit an unsolicited tear down notification frame to the originator to inform it that the EPCS priority access has been torn down.

Figure 5:
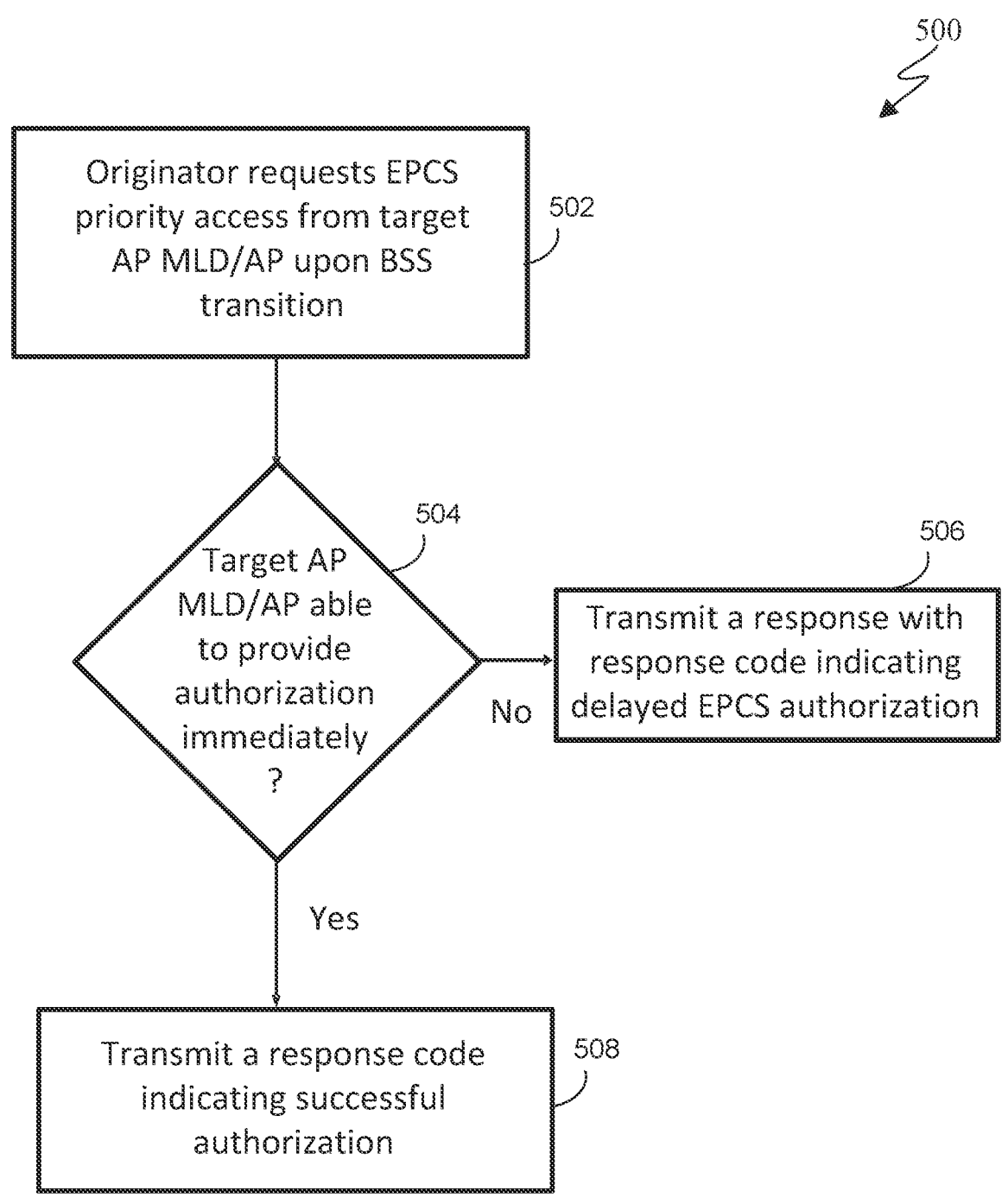
FIG. 5 illustrates an example method for EPCS priority access with delayed authorization according to embodiments of the present disclosure.

FIG. 5 illustrates an example method 500 for EPCS priority access with delayed authorization according to embodiments of the present disclosure. The embodiment of the example method 500 for EPCS priority access with delayed authorization shown in FIG. 5 is for illustration only. Other embodiments of the example method 500 for EPCS priority access with delayed authorization could be used without departing from the scope of this disclosure.

As illustrated in FIG. 5, the method 500 begins at step 502, where the originator requests EPCS priority access for the target AP MLD/AP upon BSS transition. At step 504, a determination is made whether the target AP MLD/AP is able to provide authorization immediately. If the target AP MLD/AP is not able to provide authorization immediately, then at step 506, then the target AP MLD/AP may transmit a response with a response code indicating delayed EPCS authorization. If the target AP MLD/AP is able to provide authorization immediately, then at step 508, then the target AP MLD/AP may transmit a response with a response code indicating successful authorization.

Upon BSS transition, the originator can start another EPCS priority access enable procedure with the target AP MLD/AP. It is possible that the target AP MLD/AP may not be able to provide EPCS authorization to the originator immediately (e.g., due to a large number of non-AP MLDs/STAs making a request at the same time). Consequently, the target AP MLD/AP can transmit a response with a response code indicating that there is an EPCS delayed authorization. This can allow the originator to request authorization at a later point in time.

In another embodiment, the originator can retain its EPCS priority access during BSS transition. Further according to this embodiment, each AP MLD/AP can broadcast the EDCA parameter set for EPCS priority access usage. The EDCA parameter set broadcast by the AP MLD/AP on each link by using an unsolicited broadcast action frame. Upon receiving the broadcast frame from the target AP MLD/AP, the originator can update its EDCA parameter set. Further according to this embodiment, this update can be made within the beacon interval after receiving this broadcast frame. Upon completion of BSS transition, the originator can use the EDCA parameter set that is being broadcast by the target AP MLD/AP. Further, after the transition is complete, the originator can perform another EPCS priority access request procedure with the target AP MLD/AP.

According to another embodiment, the originator can retain its EPCS priority access during BSS transition. Upon completion of BSS transition, the originator can make an EPCS priority access request with the target AP MLD/AP by transmitting a request frame. For instance, the EPCS priority access request can be made by transmission of EPCS Priority Access Enable Request frame. Upon receiving this priority access enable request frame, the target AP MLD/AP can transmit an EPCS priority access enable response frame and the originator can update its EDCA parameter set based on this response frame.

In one example, the EPCS priority access setup procedure is started but prior to completion, there is a BSS transition.

This scenario illustrates the case wherein an EPCS priority access setup procedure has started with the current AP MLD/AP but before the priority access setup procedure is complete, the originator makes a BSS transition. The priority access setup procedure can either be started by the originator, the current AP or by any other entity involved related to EPCS priority access authorization and teardown (e.g., the SSPN interface).

Figure 6:
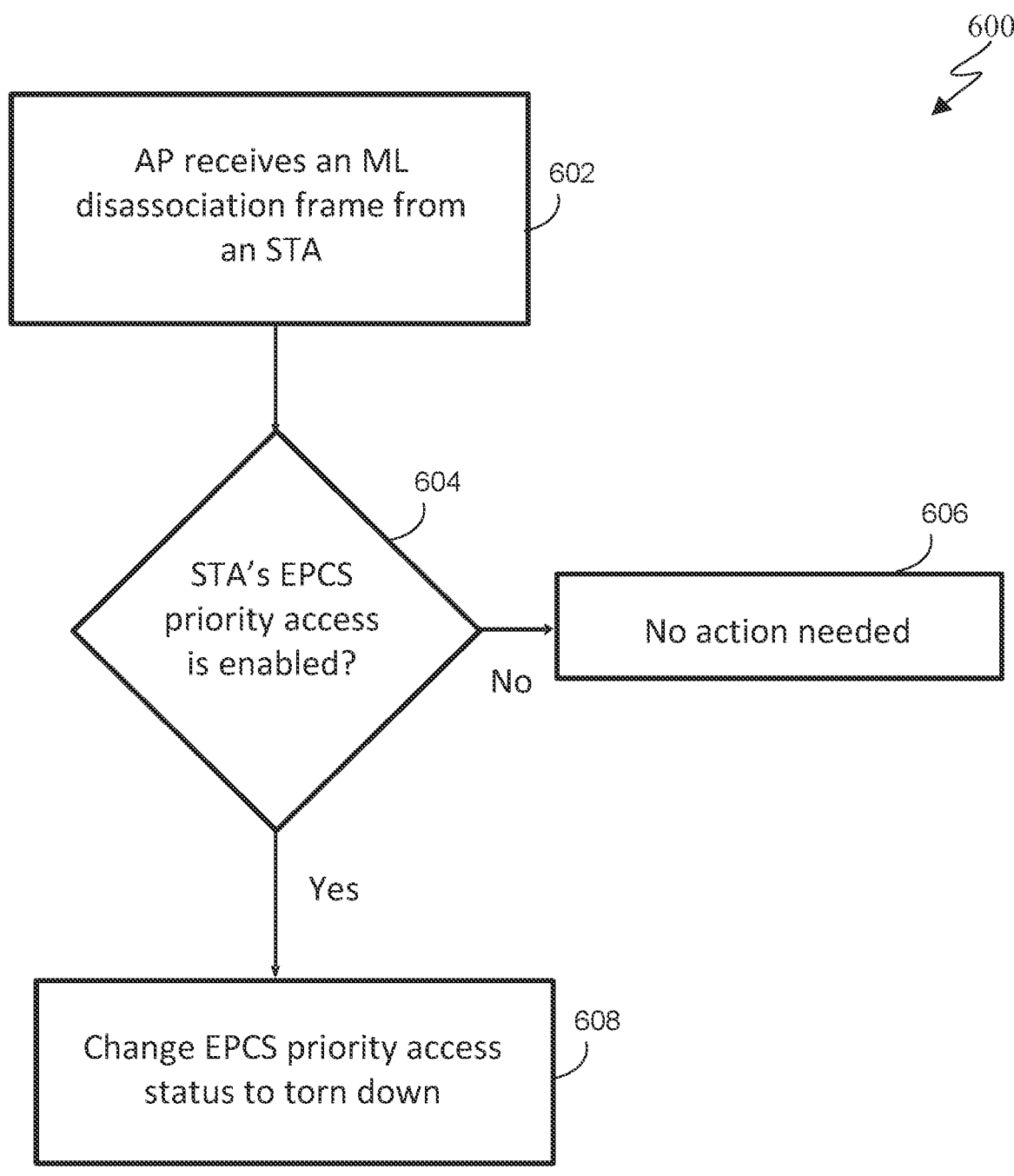
FIG. 6 illustrates an example method for an implicit EPCS priority access teardown according to embodiments of the present disclosure.

FIG. 6 illustrates an example method 600 for an implicit EPCS priority access tear down according to embodiments of the present disclosure. The embodiment of the example method 600 for an implicit EPCS priority access tear down shown in FIG. 6 is for illustration only. Other embodiments of the example method 600 for an implicit EPCS priority access tear down could be used without departing from the scope of this disclosure.

As illustrated in FIG. 6, the method 600 begins at step 602, where the AP receives an ML disassociation frame from an STA. At step 604, a determination is made whether the STA's EPCS priority access is enabled. If the STA's EPCS priority access is not enabled, then at step 606, no action is needed. If the STA's EPCS priority access is enabled, then at step 608, the EPCS priority access status is changed to torn down.

In one embodiment, the current AP MLD/AP can either perform an implicit EPCS tear down when a disassociation is detected. For instance, when the current AP MLD/AP receives a ML disassociation frame from the originator, the current AP MLD/AP can use this as a condition to tear down the EPCS priority access for the originator as shown in FIG. 6. The originator can then setup its EPCS priority access with the target AP MLD/AP.

In another embodiment, the originator cannot make a BSS transition until the EPCS priority access setup procedure which is already started with the current AP is not completed.

In one example, EPCS teardown has started but prior to completion, there is a BSS transition. For example, it is possible that an EPCS priority access tear down procedure with the current AP MLD/AP has started but before the tear down is complete, the originator makes a BSS transition. The priority access teardown procedure can be started either by the originator, the current AP or by any other entity related to EPCS priority access authorization and teardown (e.g., the SSPN interface).

In one embodiment the current AP MLD/AP can perform an implicit EPCS tear down when a disassociation is detected. For instance, when the current AP MLD/AP receives a ML disassociation frame from the originator, the current AP MLD/AP can use this as a condition to tear down the EPCS priority access for the originator as shown in FIG. 6.

In another embodiment, the originator cannot make a BSS transition until the EPCS priority access teardown procedure which is already started with the current AP is not fully completed.

In another scenario, the current AP MLD/AP and the target AP MLD/AP can communicate with each other. For example, the current AP MLD/AP and the target AP MLD/AP are a part of the same ESS.

In one example, EPCS priority access is already setup prior to BSS transition.

Figure 7:
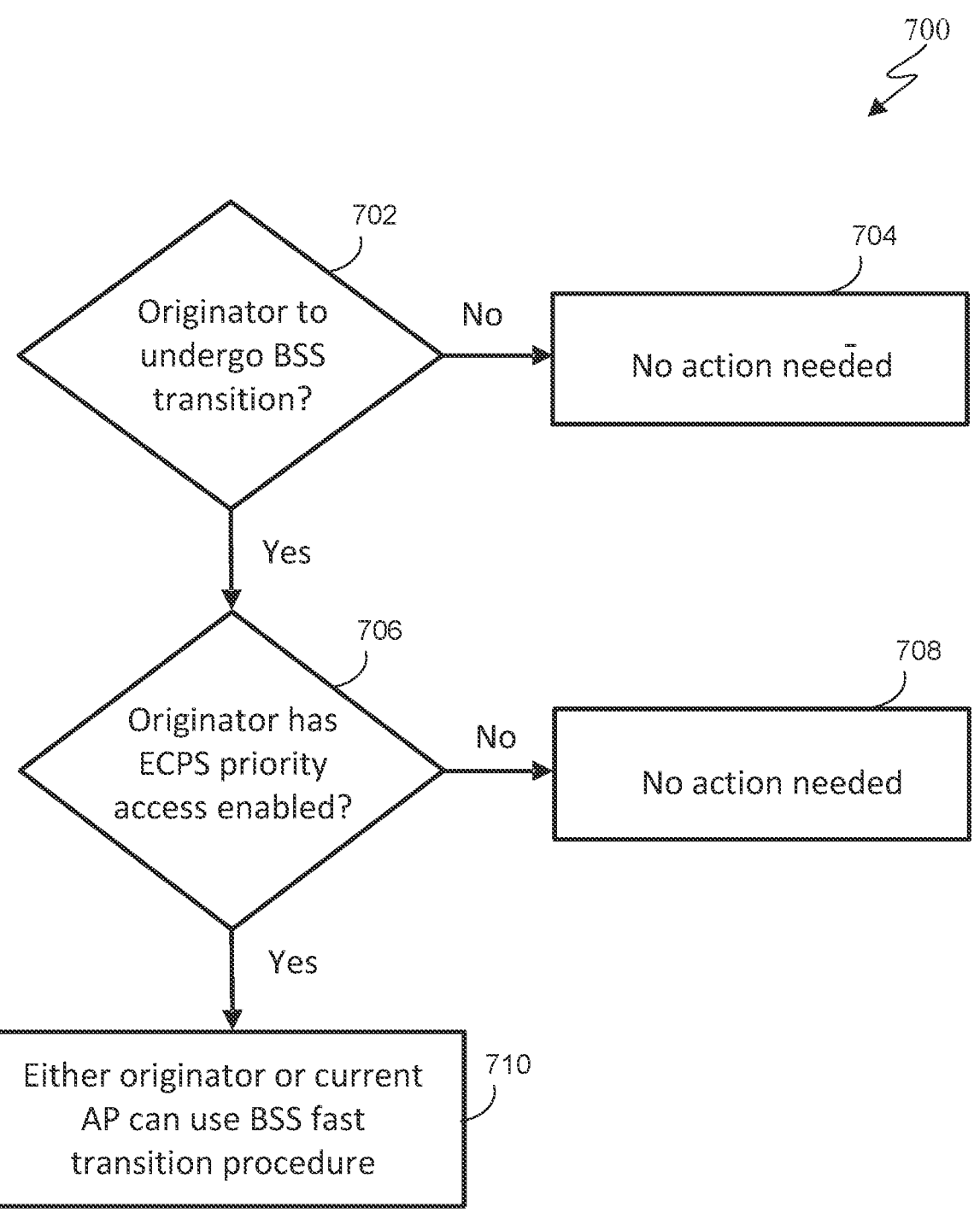
FIG. 7 illustrates an example method for fast BSS transition for EPCS priority access according to embodiments of the present disclosure.

FIG. 7 illustrates an example of a method 700 for fast BSS transition for EPCS priority access according to embodiments of the present disclosure. The embodiment of the example method 700 for fast BSS transition for EPCS priority access shown in FIG. 7 is for illustration only. Other embodiments of the example method 700 for fast BSS transition for EPCS priority access could be used without departing from the scope of this disclosure.

As illustrated in FIG. 7, the method 700 begins at step 702, where a determination is made whether the originator is to undergo BSS transition. If the originator is not to undergo BSS transition, then at step 704, no action is needed. If the originator is to undergo BSS transition, then at step 706, a determination is made whether the originator has EPCS priority access enabled. If the originator does not have EPCS priority access enabled, then at step 708, no According to one embodiment, an EPCS enabled state can be a resource that can be requested during procedures of Fast BSS transition.

According to one embodiment, the originator can create a resource information container (RIC) and insert the RIC in a request message transmitted to the target AP MLD/AP. The request message can be sent to the target AP MLD/AP directly i.e., via over the air procedure or via the current AP MLD/AP via an over the distribution system (DS) procedure. The RIC can be carried in (re)association request/response frames, authentication-confirm and authentication-ACK frames (when using over the air procedure) and FT confirm and FT ACK frames (when using over the DS procedure).

The RIC can contain one or more the information that is indicated in Table 1.

TABLE 1

Information that can be present in the RIC transmitted by the originator

| Information field | Description |
|---|---|
| EPCS priority access status | Indication that the originator has already been authorized for EPCS priority access by the current AP. For instance, the indication can be provided in the form of a bit whose value is set to 1 to indicate that EPCS priority access was already enabled by the current AP. Alternatively, the indication can be a status code indication that the EPCS priority access was already enabled by the current AP. |
| Category | Action field category definition (e.g., EHT) |
| Protected EHT Action | Defining the type of action that is being requested (e.g., EPCS priority access enable request) |
| Dialog Token | A token for matching the action responses with the action requests. |
| Priority access multi-link element | A priority access multi-link element that carries EDCA parameter set for EPCS priority access. This can be used by the target AP MLD/AP to understand the level of priority access that was provided by the current AP to the originator and the target AP MLD/AP can try to match the same level of priority access to the originator. |
| EPCS priority access request | EPCS priority access enable request frame |
| Authorization information | Information that can be used by the target AP MLD/AP to perform EPCS authorization. For instance, the information present in dot11InterworkingEntry. Further, this information can be locally cached and exchanged by any AP MLD/AP with other AP MLD(s)/AP(s) to enable a fast authorization of EPCS priority access for an originator during BSS transition. | action is needed. If the originator has EPCS priority access enabled, then at step 710, either the originator or the current AP can use the BSS fast transition procedure.

According to one embodiment, when the originator makes a BSS transition, it can use the Fast BSS transition procedure. Further according to this embodiment, the originator can use the fast transition (FT) resource request protocol which is a part of this procedure during a BSS transition.

Consequently, during BSS transition, the EPCS enabled device can retain its EPCS enabled state during a BSS transition.

Further, according to this embodiment, the authorization information of one or more devices can be locally cached and sent by the current AP MLD/AP to the target AP MLD/AP. In one embodiment, this authorization information can be the information present in dot11InterworkingEntry from the dot11InterworkingTable. Further, this information can be sent during the reassociation stage for authorizing the originator. Further, any AP MLD/AP can transmit this information in a frame sent to other AP MLD(s)/AP(s).

Figure 8:
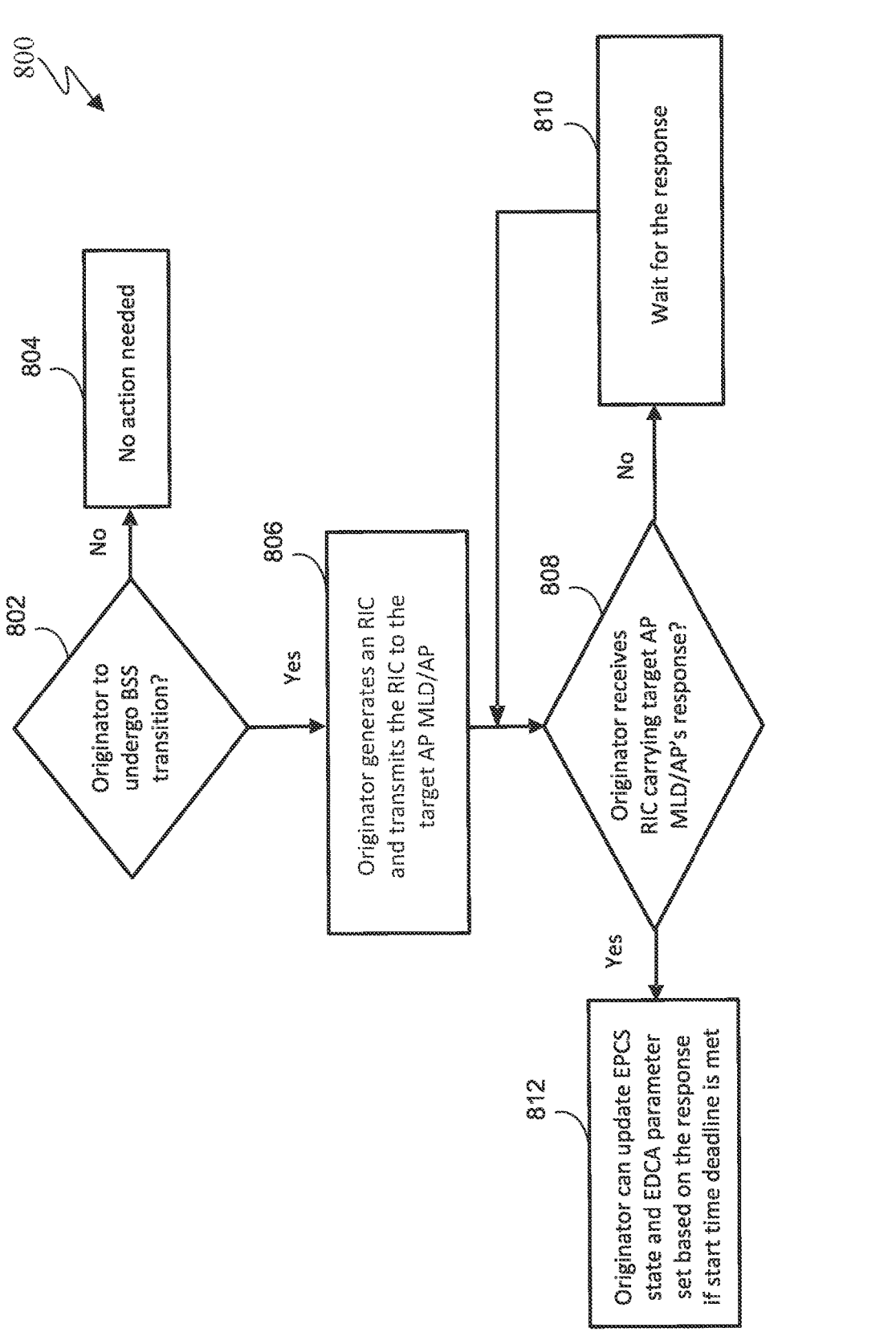
FIG. 8 illustrates an example method for direct communication between an originator and a target AP MLD/AP according to embodiments of the present disclosure.

FIG. 8 illustrates an example method 800 of direct communication between an originator and a target AP MLD/AP according to embodiments of the present disclosure. The embodiment of the example method 800 of direct communication between an originator and a target AP MLD/AP shown in FIG. 8 is for illustration only. Other embodiments of the example method 800 of direct communication between an originator and a target AP MLD/AP could be used without departing from the scope of this disclosure.

As illustrated in FIG. 8, the method 800 begins at step 802, where a determination is made whether the originator is to undergo BSS transition. If the originator is not to undergo BSS transition, then at step 804, no action is needed. If the originator is to undergo BSS transition, then at step 806, the originator generates an RIC and transmits the RIC to the target AP MLD/AP. At step 808, a determination is made whether the originator receives an RIC carrying the target AP MLD/AP's response. If the originator does not receive an RIC carrying the target AP MLD/AP's response, then at step 810, the originator waits for the response. If the originator receives an RIC carrying the target AP MLD/AP's response, then at step 812, the originator can update the EPCS state and the EDCA parameter set based on the response if the start time deadline is met.

In one example, there may be direct communication between the originator and the target AP MLD/AP. When the originator transmits the RIC in a request message transmitted directly to the target AP MLD/AP, the originator can wait for the target AP to respond to the request message. Upon receiving the message, the target AP MLD/AP can transmit an RIC containing information indicated in Table 2. When the target AP MLD/AP receives an RIC from the originator, the target AP MLD/AP can either authorize the originator as EPCS priority access enabled based on its current status. In another embodiment, the target AP MLD/AP can again perform an authorization (e.g., by using cached information or via communication with the SSPN interface) and determine the current EPCS priority access status of the originator. Then the target AP MLD/AP can communicate this current EPCS priority access status in the RIC that it transmits in response to the originator's requesting RIC.

generate an RIC on its own containing the information in Table 1 and forward that information to the target AP MLD/AP. Upon receiving the RIC from the current AP MLD/AP containing information indicated in Table 1, the target AP MLD/AP can perform EPCS authorization and then generate and transmit an RIC containing information indicated in Table 2 to the current AP. The current AP can then forward that information to the originator.

In another embodiment, the originator can retain its EPCS status during BSS transition. Further, according to this embodiment, each AP MLD/AP can broadcast EDCA parameters. The originator can make use of these broadcast EDCA parameters to update its EDCA parameters for EPCS priority access operation and continue to use EPCS priority access. The EDCA parameter set broadcast by the AP MLD/AP on each link by using an unsolicited broadcast action frame. Upon receiving the broadcast frame from the target AP MLD/AP, the originator can update its EDCA parameter set. Further according to this embodiment, this

TABLE 2

| Information in the RIC transmitted by the target AP MLD/AP | |
| --- | --- |
| Information field | Description |
| EPCS Priority Access Status | Indication of the EPCS priority access status as determined by the target AP MLD/AP. For instance, the indication can be provided in the form of a bit whose value is set to 1 to indicate that EPCS priority access was already enabled by the target AP MLD/AP. Alternatively, the indication can be a status code indication that the EPCS priority access was already enabled by the target AP MLD/AP. |
| Category | Action field category definition (e.g., EHT) |
| Protected EHT Action | Defining the type of action that is being requested (e.g., EPCS priority access enable request) |
| Dialog Token | A token for matching the action responses with the action requests. |
| Priority access multi-link element | A priority access multi-link element that carries EDCA parameter set for EPCS priority access. This EDCA parameter set is the one that the target AP MLD/AP assigns to the originator. |
| Status code | A status code to indicate the status of the request being processed by the target AP MLD/AP |
| EPCS Priority Access Response | EPCS priority access enable response frame or one or more of the fields of the EPCS priority access enable response frame |
| EPCS Priority Access start time deadline | Time by which the originator should perform the BSS transition in order for its EPCS priority access enable status to hold. After this time, the target AP MLD/AP can terminate the EPCS priority access given to the originator. |

In one example, there may be communication between the originator and the target AP MLD/AP via the current AP MLD/AP. In another embodiment, the originator can transmit the RIC containing information indicated in Table 1 in a request message transmitted to the current AP MLD/AP. The current AP MLD/AP can then forward the RIC to the target AP MLD/AP over the DS. Upon receiving the message, the RIC can process the message in the same manner as described above (under direct communication between originator and the target AP MLD/AP). The target AP MLD/AP can then send the response message containing the RIC with the information indicated in Table 2 to the current AP and the current AP can forward the response RIC to the originator.

In another embodiment, when the current AP MLD/AP detects a BSS transition, the current AP MLD/AP can update can be made within the beacon interval after receiving this broadcast frame. Upon completion of BSS transition, the originator can use the EDCA parameter set that is being broadcast by the target AP MLD/AP. Further, after the transition is complete, the originator can perform another EPCS priority access request procedure with the target AP MLD/AP.

In another embodiment, the originator can retain its EPCS priority access status. Further after BSS transition, the originator can request the EDCA parameter set for EPCS operation from the target AP MLD/AP by transmitting a BSS transition EPCS priority access parameters request frame. The BSS transition EPCS priority access parameters request frame can contain one or more parameters indicated in Table 3.

TABLE 3

| EPCS priority access parameters request frame | |
| --- | --- |
| Information field | Description |
| EPCS priority access status | Indication that the originator has already been authorized for EPCS priority access by the current AP. For instance, the indication can be provided in the form of a bit whose value is set to 1 to indicate that EPCS priority access was already enabled by the current AP. Alternatively, the indication can be a status code indication that the EPCS priority access was already enabled by the current AP. |
| Category | Action field category definition (e.g., EHT) |
| Protected EHT Action | Defining the type of action that is being requested (e.g., EPCS priority access enable request) |
| Dialog Token | A token for matching the action responses with the action requests. |
| Priority access multi-link element | A priority access multi-link element that carries EDCA parameter set for EPCS priority access. This can be used by the target AP MLD/AP to understand the level of priority access that was provided by the current AP to the originator and the target AP MLD/AP can try to match the same level of priority access to the originator. |
| EPCS priority access request | EPCS priority access enable request frame |

In one example, the EPCS priority access setup procedure is started but prior to completion, there is a BSS transition. In this scenario, the EPCS priority access setup procedure has been initiated by the originator and before the priority access procedure is complete a BSS transition occurs.

According to one embodiment, when such a scenario occurs, the current AP MLD/AP can do an implicit EPCS teardown based on BSS transition detection. This can be done using the steps depicted in FIG. 6. The current AP MLD/AP can transmit an unsolicited EPCS priority access teardown frame to the originator to inform the originator that its EPCS priority access has been torn down. The originator can then perform a new EPCS priority access setup with the target AP MLD/AP after BSS transition.

In another embodiment, when a BSS transition occurs, the STA can be required to tear down its EPCS setup with the current AP MLD/AP and setup the EPCS priority access with the target AP MLD/AP after BSS transition.

In another embodiment, when the current AP MLD/AP detects a BSS transition, the current AP MLD/AP can continue to complete the EPCS priority access setup procedure and upon completion can transmit a message indicating that the originator has been authorized for EPCS priority access to the target AP MLD/AP. The target AP MLD/AP can then send an unsolicited EPCS priority access enable response frame to the originator.

In one example, EPCS teardown has started but prior to completion, there is a BSS transition. In this scenario, the EPCS teardown procedure has been initiated but before the EPCS priority access teardown procedure is complete, the originator makes a BSS transition. The priority access teardown procedure can be started either by the originator, the current AP or by any other entity related to EPCS priority access authorization and teardown (e.g., the SSPN interface).

According to one embodiment, the current AP MLD/AP can do an implicit teardown when BSS transition is detected and transmit a EPCS priority access teardown frame to the originator. If the originator has already disassociated by the time the current AP MLD/AP has completed the teardown procedure, the current AP MLD/AP can forward the teardown message to the target AP MLD/AP and the target AP MLD/AP can then transmit the message to the originator.

In another embodiment, the originator can be required to perform a EPCS priority access teardown with the current AP each time a BSS transition occurs.

In another embodiment, the methods, procedures and information exchange performed by using an RIC can also be performed by using the Fast BSS Transition element (FTE) or in a different information element/frame. Further, according to this embodiment, the information can be carried in any of the existing frames defined in the standard.

An EPCS non-AP MLD behaving as an FTO can be referred to as the EPCS FTO. An EPCS AP MLD behaving as an FTR can be referred to as the EPCS FTR.

According to one embodiment, the EPCS non-AP MLD can transmit a frame during BSS transition to indicate that it has been authorized for EPCS priority access operation. EPCS non-AP MLD can also transmit a frame to request its authority to retain/use EPCS priority access be confirmed during fast BSS transition and (re)association procedures. This request can be to retain/enable EPCS priority access after BSS transition is complete.

Figure 11:
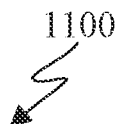
FIG. 11 illustrates an example format of an EPCS sub-element according to embodiments of the present disclosure.
Figure 11:
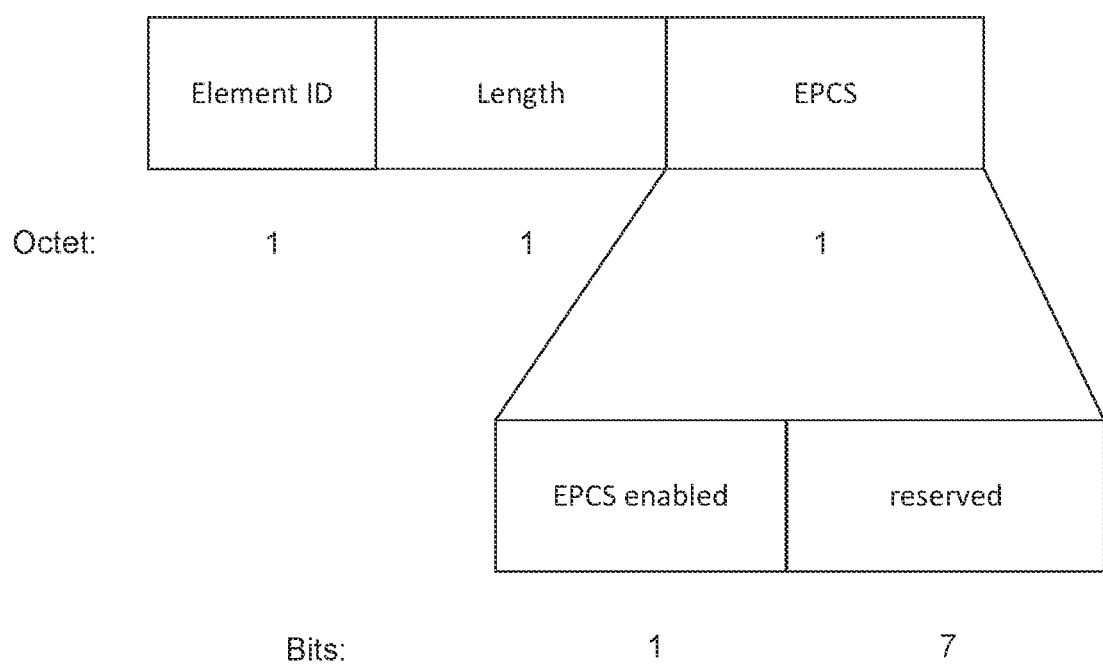

The frame transmitted by the EPCS non-AP MLD during BSS transition as described above can contain a field in which the EPCS non-AP MLD can assert that it has EPCS authorization (example shown in FIG. 11). The AP MLD of the access network/infrastructure network can check/verify if the assertion of the EPCS non-AP MLD is true and accept the assertion.

According to one embodiment, the EPCS FTO can assert that it has EPCS authorization. This assertion can be verified/confirmed by the access network (e.g., AP MLD, EPCS FTR, etc.). Upon verification/confirmation, the assertion of the EPCS FTO can be accepted.

According to one embodiment, the EPCS FTO can transmit a frame to EPCS FTR to request for transferring authority to use EPCS. The frame can contain at least one or more of the information items as indicated in Table 4.

TABLE 4

| Information items that can be present in frame used for transferring of authority | |
| --- | --- |
| Information item | Description |
| EPCS authorization info | An information item that can indicate/assert the current authorization state of the EPCS FTO. For instance, this can be a field/subfield that can take a particular value to make this indication/ assertion. In this example, this information can be conveyed through a one bit field/subfield whose value can be set to 1 to indicate/assert that the EPCS FTO is EPCS authorized. |
| EPCS authorization transfer request | An information item that can indicate a request for transfer of EPCS priority access authority or authority to use EPCS priority access after BSS transition. For instance, this can be a field/subfield that can take a particular value to make this indication/ assertion. In this example, this information can be conveyed through a one bit field/subfield whose value can be set to 1 to indicate/assert that the EPCS FTO is requesting for transfer of EPCS priority access authority or authority to use EPCS priority access after BSS transition. |

One or more of the above information items can be carried in independent frames or any of the existing frames in the standard (e.g., any of the frames that are involved in fast BSS transition process). Also, the above information items can be indicated in different fields/subfields in the same or different frame or by using the same field/subfield in a frame i.e., the same field/subfield that indicates that device has EPCS authorization can also indicate that it is making a request to transmit this EPCS authorization as a part of the BSS transition. E.g., this can be done in frames that are used in fast BSS transition procedure. Since the frames are used for BSS transition handling, the same field/subfield that indicates that the FTO is EPCS authorized can implicitly also request that the FTO's EPCS authorization be transferred during the BSS transition.

In one example the above information can be carried in the FT capabilities and policy field of the mobility domain element. This can be useful, for instance, if EPCS authorization transfer is limited to a particular mobility domain.

In another example, the above information can be carried in RSNXE field. This can be useful, for instance, in an ESS with multiple mobility domains to enable the EPCS device to make the request on any BSS transition. The APs in the same ESS can advertise the same HESSID.

According to one embodiment, the EPCS FTR can transmit a frame to the EPCS FTO to inform the FTO about the transfer of EPCS authority. This frame can be transmitted in an unsolicited manner or in response to the FTO's request.

The frame can contain at least one or more of the information items as indicated in Table 5.

TABLE 5

| Information items that can be present in the frame used for indicating the authority transfer | |
| --- | --- |
| Information item | Description |
| EPCS authorization info | An information item to indicate that the EPCS authority of the FTO is transferred or that the EPCS FTO has the authority to enable EPCS. E.g., this can be a field/subfield that can take a particular value to indicate that the EPCS FTO is authorized to enable EPCS priority access and to another value to indicate that |

TABLE 5-continued

| Information items that can be present in the frame used for indicating the authority transfer | |
| --- | --- |
| Information item | Description |
| | it is not authorized to enable EPCS priority access. In this example this can be a one bit field/subfield whose value can be set to 1 to indicate that the EPCS FTO is authorized to enable EPCS priority access to 0 to indicate that the EPCS FTO is not authorized to enable EPCS priority access. |

The FTR can verity the authority of the EPCS FTO to enable EPCS priority access by any means available to it. For example, it can be done by communication with the SSPN interface. In another example, this can be done by using the information cached by the EPCS AP MLD associated with R0KH.

One or more of the above information items can be carried in independent frames or any of the existing frames in the standard (e.g., any of the frames that are involved in fast BSS transition process). Also, the above information items can be indicated in different fields/subfields in the same or different frame or by using the same field/subfield in a frame.

Figure 9:
FIG. 9 illustrates an example format of a modified FT capability and policy field in a mobility domain element (MDE) according to embodiments of the present disclosure.

FIG. 9 illustrates an example format of a modified FT capability and policy field in an MDE 900 according to embodiments of the present disclosure. The embodiment of the example format of a modified FT capability and policy field in an MDE 900 shown in FIG. 9 is for illustration only. Other embodiments of the example format of a modified FT capability and policy field in an MDE 900 could be used without departing from the scope of this disclosure.

In one example the above information can be carried in the FT capabilities and policy field of the mobility domain element.

For instance, this information can be carried in the FT Capability and Policy field of the mobility domain element (MDE). The MDE can be carried in a frame transmitted by the non-AP MLD (e.g., (Re)association request frame, authentication request frame).

For achieving the above purpose, the FT capability and policy field of the MDE can carry a field that can have a specified value to make the indication. For example, as shown in FIG. 9, the structure of the FT Capability and Policy field can be modified to contain a one bit subfield (for example, EPCS authorized, or another name) that can be used to make the above indication when set to 1. The subfield can also be referred to as EPCS authorized, or by another name.

The non-AP MLD can set this subfield to 1 to make the above indication(s).

Figure 10:
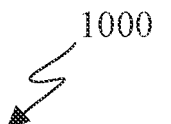
FIG. 10 illustrates an example format of a modified robust security network extension element (RSNXE) according to embodiments of the present disclosure.

FIG. 10 illustrates an example format of a modified RSNXE 1000 according to embodiments of the present disclosure. The embodiment of the example format of a modified RSNXE 1000 shown in FIG. 10 is for illustration only. Other embodiments of the example format of a modified RSNXE 1000 could be used without departing from the scope of this disclosure.

In another example, the above field can also be placed in the Robust Security Network Extension element (RSNXE). For instance, the field can be placed in the Extended RSN capabilities subfield in the RSNXE. In a large networks with multiple mobility domains, this can enable the non-AP MLD to assert its EPCS authorization on any BSS transition.

An example format of the modified RSNXE can be as shown in FIG. 10.

The Extended RSN Capabilities field can be modified as shown in Table 5.1.

TABLE 5.1

| | Modified Extended RSN Capabilities field | |
|---|---|---|
| Bit | Information | Notes |
| 0-3 | Field length | The length of the Extended RSN Capabilities field, in octets, minus 1, i.e., n − 1 |
| 4 | Protected TWT Operations Support | The STA sets the Protected TWT Operations Support field to 1 when dot11ProtectedTWTOperationsImplemented is true, and sets it to 0 otherwise |
| 5 | SAE hash-to-element | The STA supports directly hashing to obtain the PWE instead of looping. |
| 6 | EPCS authorization | The STA (EPCS non-AP MLD/FTO or its affiliated STA) can set the EPCS authorization to 1 to assert its EPCS authorization on BSS transition |
| 7 − (8 × n − 1) | Reserved | |

According to one embodiment, EPCS AP MLD can indicate to non-AP MLD that the non-AP MLD's authority to retain/enable EPCS priority access has been verified/allowed. For instance, the EPCS non-AP MLD can assert to the AP MLD that it has EPCS authorization as described above and the AP MLD can verify/confirm that the non-AP MLD has authorization and accept the assertion.

The EPCS AP MLD can also transmit a frame to advertise its support (e.g., capability support for transferring EPCS during fast BSS transition) to the non-AP MLD.

For instance, this information can be carried in the FT Capability and Policy field of the MDE. The MDE can be carried in a frame transmitted by the AP MLD (e.g., beacons, authentication responses).

The same modified FT capability and policy field in the MDE (FIG. 9) can be used by the AP MLD to make the above indication(s). AP MLD can also set the value to 1 when making the above indication(s).

According to another example, above field can also be placed in the Robust Security Network Extension element (RSNXE) for use in large networks with multiple mobility domains. In this example, the same EPCS authorization field can be set to 1 to make the above indication.

According to one embodiment, the EPCS FTO can request that the EPCS priority access state be transferred during BSS transition.

According to one embodiment, the EPCS FTO can make this request via one or more frames transmitted to the EPCS FTR.

According to one example, the indicated frame(s) can be transmitted after successful conclusion/completion of the BSS transition process.

According to one embodiment, the frame can contain at least one or more of the information items as indicated in Table 6.

TABLE 6

| | Information items that can be present in the frame transmitted to request EPCS state transfer | |
|---|---|---|
| Information item | Description | |
| EPCS state info | An information item to indicate the EPCS state of the FTO. E.g., this can be a field/subfield that can take a particular value to indicate that the EPCS state of the FTO is enabled and another value to indicate that the EPCS state of the FTO is disabled. In this example, this can be a one bit field/subfield | |

TABLE 6-continued

| | Information items that can be present in the frame transmitted to request EPCS state transfer | |
|---|---|---|
| Information item | Description | |
| EPCS state transfer request | that can be set to 1 to indicate that the EPCS state of the FTO is enabled and to 0 to indicate that the EPCS state of the FTO is disabled. An information item to indicate that the EPCS state of the FTO be transferred during the BSS transition process. E.g., this can be a field/subfield that can take a certain value to indicate that a request is being made. In this example, this can be a one bit field/subfield that can be set to 1 to request that AP MLD should enable EPCS priority access after the completion of the BSS transition procedure. | |

One or more of the above information items can be carried in independent frames or any of the existing frames in the standard (e.g., any of the frames that are involved in fast BSS transition process). Also, the above information items can be indicated in different fields/subfields in the same or different frame or by using the same field/subfield in a frame i.e., the same field/subfield that indicates that device has EPCS state set to enabled can also indicate that it is making a request to transmit this EPCS state as a part of the BSS transition. E.g., this can be done in frames that are used in fast BSS transition procedure. Since the frames are used for BSS transition handling, the same field/subfield that indicates that the FTO is EPCS enabled state can implicitly also request that the FTO's EPCS enabled state be transferred during the BSS transition.

In one example, the above field can be carried in the EPCS control subelement of the fast BSS transition element.

FIG. 11 illustrates an example format of an EPCS sub-element 1100 according to embodiments of the present disclosure. The embodiment of the example format of an EPCS sub-element 1100 shown in FIG. 11 is for illustration only. Other embodiments of the example format of an EPCS sub-element 1100 could be used without departing from the scope of this disclosure.

According to one embodiment, a non-AP MLD can transmit a frame to request that the EPCS AP MLD can enable EPCS priority access for the non-AP MLD after the fast BSS transition operation is completed. The non-AP MLD can make such an indication in the frame it transmits.

For instance, an EPCS control subelement can contain this information and this subelement can be present in the FTE. The subelement can have a format as shown in FIG. 11. As indicated the subelement contains a EPCS field.

The non-AP MLD can set the EPCS enabled sub-field in FIG. 11 to 1 to make the request.

In another example, the above field can be carried in the RSNXE. The example modified RSNXE can be as shown in FIG. 10.

The Extended RSN Capabilities field can be modified as shown in Table 6.1. One or more of the indication subfield can be absent.

TABLE 6.1

| | Modified Extended RSN Capabilities field | |
|---|---|---|
| Bit | Information | Notes |
| 0-3 | Field length | The length of the Extended RSN Capabilities field, in octets, minus 1, i.e., n − 1 |
| 4 | Protected TWT Operations Support | The STA sets the Protected TWT Operations Support field to 1 when dot11ProtectedTWTOperationsImplemented is true, and sets it to 0 otherwise |
| 5 | SAE hash-to-element | The STA supports directly hashing to obtain the PWE instead of looping. |
| 6 | EPCS authorization | The STA (EPCS non-AP MLD/FTO or its affiliated STA) can set the EPCS authorization to 1 to assert its EPCS authorization on BSS transition |
| 7 | EPCS enabled | The STA (EPCS non-AP MLD/FT or its affiliated STA) can set the EPCS enabled bit to 1 to request EPCS state transfer |
| 8 − (8 × n − 1) | Reserved | |

According to one embodiment, the EPCS FTO can be informed that its EPCS priority access state has been transferred during BSS transition. This can be done by transmission of a frame that carried such an indication. In one example, the indication can be made by the target EPCS FTR.

The indication can be made by transmission of one or more frames that contain at least one or more of the information items as indicated in Table 7.

TABLE 7

| Information items that can be present in indication frame | |
|---|---|
| Information item | Description |
| EPCS state transfer info | An information item that can indicate if the EPCS FTO's EPCS state has been transferred. E.g., this can be a field/subfield that can take a particular value to indicate that the state has been transferred and to another value to indicate that the state has not been transferred. In this example, this can be a one bit field/subfield that can be set to 1 to indicate that the state has been transferred. |

One or more of the above information items can be carried in independent frames or any of the existing frames in the standard (e.g., any of the frames that are involved in fast BSS transition process). Also, the above information items can be indicated in different fields/subfields in the same or different frame or by using the same field/subfield in a frame.

In one example, the above field can be carried in the EPCS control subelement of the fast BSS transition element.

According to one embodiment, the AP MLD can also make an indication to the non-AP MLD that its EPCS priority access has been enabled/retained during the fast BSS transition. AP MLD can also transmit a frame to the non-AP MLD that can make such an indication.

For instance, the AP MLD can also use the EPCS control subelement and set to the EPCS enabled subfield to 1 to make the indication.

In another example, the above field can be carried in the RSNXE. The same EPCS enabled bit shown in Table 6.1 can be set to 1 to make the indication.

In the following, example behavior of the EPCS non-AP MLD, EPCS AP MLD, EPCS FTO behavior and EPCS FTR behavior when using the modified MDE and FTE are shown. This can also be achieved by using the RSNXE as well.

When a non-AP MLD performs (Re)association within a mobility domain, it can use the FT initial mobility domain association procedure in RSN to transfer EPCS authority during BSS transition. The non-AP MLD can set EPCS authorized field (as shown in FIG. 9) to 1 in the MDE in the (Re)association request that it transmits.

The non-AP MLD can only transmit such a (Re)association request to an AP MLD that advertises its capability to support EPCS transfer during BSS transition as described in an embodiment previously.

If the non-AP MLD's (re)association is successful and if the non-AP MLD receives an association response from the AP MLD with the EPCS authorized field (in FIG. 9) in MDE set to 1, then the non-AP MLD can include EPCS as a part of the fast BSS transition as described later. If this field is set to 0, then non-AP MLD cannot include EPCS as a part of the fast BSS transition procedure described in this disclosure.

Upon receiving the (Re)association request from the non-AP MLD, if an AP MLD finds that the EPCS authorized field is set to 1, then the AP MLD can verify the non-AP MLD's authorization for EPCS. AP MLD can do this on its own or by using cached information.

If the (re)association process is successful and AP MLD has verified the non-AP MLD's authorization for EPCS, then it can set the EPCS authorized field to 1 in the MDE in the (Re)association response frame that it transmits to the non-AP MLD.

An EPCS AP MLD that is associated with a R0KH can cache EPCS authorization information (e.g., authorization state) for use in subsequent fast BSS transition procedures.

When R0KH delivers the PMK-R1 to the R1KH, the AP associated with R0KH can transfer the authorization information for the requesting EPCS non-AP MLD to the AP MLD that has received the (Re)association request.

An EPCS FTO can use the over-the-air FT protocol in an RSN to transfer authority to use EPCS priority access as a part of its fast BSS transition. The EPCS FTO can set the EPCS authorized field (shown in FIG. 9) to 1 in the authentication (or association) request frame that it transmits to the target EPCS FTR.

The EPCS FTO can set the EPCS enabled subfield (in FIG. 11) to 1 to request that the EPCS priority access be enabled/enabled status be retained after the BSS transition process is successfully completed. The EPCS enabled field can be set to 1 in the authentication request that the EPCS FTO transmits to the EPCS FTR. If such a request is not made, then the field can be set to 0.

After BSS transition is completed, if the EPCS FTO has received an authentication response with EPCS enabled subfield set to 1, it can retain/enable its EPCS priority access state (e.g., keep the priority access state to enabled, use enhanced EDCA parameter set). If a new EDCA parameter set is not provided to the EPCS FTO during fast BSS transition, then the EPCS FTO can continue to use the default EDCA parameters. Otherwise, the EPCS FTO can be provided with an updated EPCS priority access operation parameters (e.g., enhanced EDCA parameter set) in a unicast/broadcast/multicast manner. E.g., this can be done by the AP MLD by transmitting an update frame (e.g., EPCS priority access enable response frame in an unsolicited manner).

If an EPCS FTR receives a frame (e.g., authentication request frame) in which the EPCS authorized field (FIG. 9) is set to 1 in the MDE, then the EPCS FTR can verify the authority of the EPCS FTO for EPCS priority access (retain the state/enable the state). E.g., this can be done by using the information cached by the EPCS AP MLD that is associated with the R0KH). In another example, it can also be done by verification with the SSPN interface.

If authentication is successful and EPCS authorization is also verified for the EPCS FTO, then the EPCS FTR can set the EPCS authorized subfield (FIG. 9) to 1 in the MDE in the authentication response frame that the EPCS FTR transmits to the EPCS FTO. If not authenticated/authorized, then this field can be set to 0.

If the EPCS enabled subfield (FIG. 11) is set to 1 in the authentication request frame and the transition is successful and the EPCS FTO's authorization to enable/retain its EPCS authorization is successfully verified, and the EPCS FTR accepts the request to enable EPCS priority access for the EPCS FTO, the FTR can set the EPCS enabled field (FIG. 11) to 1 in the authentication response that it transmits to the FTO. The EPCS FTR can also update the EPCS operation parameters (e.g., enhanced EDCA parameter set) with the EPCS FTO (e.g., by transmitting a unicast update frame (e.g., EPCS priority access enable response frame) to the FTO).

If the FTO does not make a request by setting EPCS enabled subfield to 1 or if it is not authorized by the FTR for EPCS priority access, then the EPCS enabled subfield in the authentication response can be set to 0.

The above information can be transmitted in an independent frame or in any of the frames existing in the standard or a frame different from the one indicated in the descriptions E.g., instead of carrying information items in authentication request/response frames, they can be present in (Re)Association request/response frames and vice versa.

In the above embodiments, instead of or in addition to using the modified FT capability and policy field in MDE in the frames exchanged between the non-AP MLD and the AP MLD (e.g., association request and response frames), the modified RSNXE with the same information (as described earlier) can be included.

According to another embodiment, HESSID can be used to advertise an ESS. APs affiliated in the same ESS can advertise the same HESSID and this can allow a non-AP MLD to assert that it has EPCS authorization while performing a BSS transition.

FIG. 12 illustrates a flowchart of a method 1200 for wireless communication performed by a non-AP device that comprises a STA according to embodiments of the present disclosure. The embodiment of the method 1200 for wireless communication performed by a non-AP device that comprises a STA shown in FIG. 12 is for illustration only. Other embodiments of the method 1200 for wireless communication performed by a non-AP device that comprises a STA could be used without departing from the scope of this disclosure.

As illustrated in FIG. 12, the method 1200 begins at step 1202, where the non-AP device forms a first link with a first AP of a first AP MLD and a second link with a second AP of a second AP MLD. At step 1204, the non-AP device receives information associated with EPCS priority access from the first AP and the second AP, wherein the STA supports the EPCS priority access. At step 1206, the non-AP device determines whether the STA is to undergo or is undergoing a BSS transition from the first AP to the second AP. At step 1208, when the STA is not to undergo or is not undergoing the BSS transition from the first AP to the second AP, the non-AR device continues with a current EPCS priority access. At step 1210, when the STA is to undergo or is undergoing the BSS transition from the first AP to the second AP, the non-AP device determines a procedure for handling the EPCS priority access associated with the BSS transition from the first AP to the second AP.

In one embodiment, the STA is to undergo or is undergoing the BSS transition from the first AP to the second AP, and the non-AP device determines whether the EPCS priority access is already setup prior to the BSS transition from the first AP to the second AP, determines whether an EPCS priority access setup procedure has started but prior to completion, the BSS transition from the first AP to the second AP is occurring, or determines whether EPCS teardown has started but prior to completion, the BSS transition from the first AP to the second AP is occurring.

In one embodiment, the EPCS priority access is already setup prior to the BSS transition from the first AP to the second AP; and the non-AD device determines whether the first AP and the second AP can communicate with each other; and based on determining that the first AP and the second AP can communicate with each other: uses a fast BSS transition procedure so that the STA retains an EPCS enabled state during the BSS transition from the first AP to the second AP; and generates a resource information container for transmission to the second AP.

In one embodiment, the EPCS priority access is already setup prior to the BSS transition from the first AP to the second AP; and the non-AP device determines whether the first AP and the second AP can communicate with each other; based on determining that the first AP and the second AP can communicate with each other, generates a request for transferring authority to use the EPCS priority access or a request for transferring an EPCS priority access state during the BSS transition from the first AP to the second AP; and based on determining that the first AP and the second AP cannot communicate with each other, tears down the EPCS priority access prior to the BSS transition from the first AP to the second AP.

In one embodiment, the EPCS priority access setup procedure has started but prior to completion, the BSS transition from the first AP to the second AP is occurring; and the non-AP device determines whether the first AP and the second AP can communicate with each other; based on determining that the first AP and the second AP can communicate with each other: determines that the EPCS priority access has been torn down; and sets up a new EPCS priority access with the second AP after the BSS transition from the first AP to the second AP; and based on determining that the first AP and the second AP cannot communicate with each other: generates a disassociation frame; determines that the EPCS priority access has been torn down; and sets up a new EPCS priority access with the second AP after the BSS transition from the first AP to the second AP.

In one embodiment, the EPCS teardown has started but prior to completion, the BSS transition from the first AP to the second AP is occurring; and the non-AP device determines whether the first AP and the second AP can communicate with each other; based on determining that the first AP and the second AP can communicate with each other: determines that the EPCS priority access has been torn down; and sets up a new EPCS priority access with the second AP after the BSS transition from the first AP to the second AP; and based on determining that the first AP and the second AP cannot communicate with each other: generates a disassociation frame; determines that the EPCS priority access has been torn down; and sets up a new EPCS priority access with the second AP after the BSS transition from the first AP to the second AP.

In one embodiment, the non-AP device generates an association message for authorizing the STA for the EPCS priority access with the second AP; and determines that the STA is authorized for the EPCS priority access with the second AP based on locally cached authorization information for enabling verification and confirming authority during association with the second AP.

In one embodiment, the non-AP device receives a message from the second AP indicating that the second AP is unable to verify that the STA is authorized for EPCS priority access; and generates an EPCS authorization request at a later time.

The above flowcharts illustrate example methods that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) device comprising:
a station (STA) comprising a transceiver configured to:

form a first link with a first AP of a first AP MLD and a second link with a second AP of a second AP MLD; and receive information associated with emergency preparedness communication services (EPCS) priority access from the first AP and the second AP, wherein the STA supports the EPCS priority access; and a processor operably coupled to the STA, the processor configured to:
determine whether the STA is to undergo or is undergoing a basic service set (BSS) transition from the first AP to the second AP;

when the STA is not to undergo or is not undergoing the BSS transition from the first AP to the second AP, continue with a current EPCS priority access; and when the STA is to undergo or is undergoing the BSS transition from the first AP to the second AP, determine a procedure for handling the EPCS priority access associated with the BSS transition from the first AP to the second AP.

2. The non-AP device of claim 1, wherein:
the STA is to undergo or is undergoing the BSS transition from the first AP to the second AP, and to determine the procedure for handling the EPCS priority access associated with the BSS transition from the first AP to the second AP, the processor is configured to:
determine whether the EPCS priority access is already setup prior to the BSS transition from the first AP to the second AP, determine whether an EPCS priority access setup procedure has started but prior to completion, the BSS transition from the first AP to the second AP is occurring, or determine whether EPCS teardown has started but prior to completion, the BSS transition from the first AP to the second AP is occurring.

3. The non-AP device of claim 2, wherein:
the EPCS priority access is already setup prior to the BSS transition from the first AP to the second AP; and the processor is further configured to:
determine whether the first AP and the second AP can communicate with each other; and based on determining that the first AP and the second AP can communicate with each other:
use a fast BSS transition procedure so that the STA retains an EPCS enabled state during the BSS transition from the first AP to the second AP; and generate a resource information container for transmission to the second AP.

4. The non-AP device of claim 2, wherein:
the EPCS priority access is already setup prior to the BSS transition from the first AP to the second AP; and the processor is further configured to:
determine whether the first AP and the second AP can communicate with each other;

based on determining that the first AP and the second AP can communicate with each other, generate a request for transferring authority to use the EPCS priority access or a request for transferring an EPCS priority access state during the BSS transition from the first AP to the second AP; and based on determining that the first AP and the second AP cannot communicate with each other, teardown the EPCS priority access prior to the BSS transition from the first AP to the second AP.

5. The non-AP device of claim 2, wherein:

the EPCS priority access setup procedure has started but prior to completion, the BSS transition from the first AP to the second AP is occurring; and the processor is further configured to:

determine whether the first AP and the second AP can communicate with each other;

based on determining that the first AP and the second AP can communicate with each other:

determine that the EPCS priority access has been torn down; and setup a new EPCS priority access with the second AP after the BSS transition from the first AP to the second AP; and based on determining that the first AP and the second AP cannot communicate with each other:

generate a disassociation frame;

determine that the EPCS priority access has been torn down; and setup a new EPCS priority access with the second AP after the BSS transition from the first AP to the second AP.

6. The non-AP device of claim 2, wherein:

the EPCS teardown has started but prior to completion, the BSS transition from the first AP to the second AP is occurring; and the processor is further configured to:

determine whether the first AP and the second AP can communicate with each other;

based on determining that the first AP and the second AP can communicate with each other:

determine that the EPCS priority access has been torn down; and setup a new EPCS priority access with the second AP after the BSS transition from the first AP to the second AP; and based on determining that the first AP and the second AP cannot communicate with each other:

generate a disassociation frame;

determine that the EPCS priority access has been torn down; and setup a new EPCS priority access with the second AP after the BSS transition from the first AP to the second AP.

7. The non-AP device of claim 2, wherein to determine the procedure for handling the EPCS priority access associated with the BSS transition from the first AP to the second AP, the processor is further configured to:

generate an association message for authorizing the STA for the EPCS priority access with the second AP; and determine that the STA is authorized for the EPCS priority access with the second AP based on locally cached authorization information for enabling verification and confirming authority during association with the second AP.

8. The non-AP device of claim 2, wherein to determine the procedure for handling the EPCS priority access associated with the BSS transition from the first AP to the second AP, the processor is further configured to:

receive a message from the second AP indicating that the second AP is unable to verify that the STA is authorized for EPCS priority access, and generate an EPCS authorization request at a later time.

9. An access point (AP) device comprising:

a transceiver configured to:

form a first link with a station (STA); and receive information associated with emergency preparedness communication services (EPCS) priority access from the STA, wherein the STA supports the EPCS priority access; and a processor operably coupled to the transceiver, the processor configured to:

determine whether the STA is to undergo or is undergoing a basic service set (BSS) transition to the AP;

when the STA is not to undergo or is not undergoing the BSS transition to the AP, continue with a current EPCS priority access; and when the STA is to undergo or is undergoing the BSS transition to AP, determine a procedure for handling the EPCS priority access associated with the BSS transition to the AP.

10. The AP device of claim 9, wherein:

the STA is to undergo or is undergoing the BSS transition to the AP, and to determine the procedure for handling the EPCS priority access associated with the BSS transition to the AP, the processor is configured to:

determine whether the EPCS priority access is already setup prior to the BSS transition to the AP, determine whether an EPCS priority access setup procedure has started but prior to completion, the BSS transition to the AP is occurring, or determine whether EPCS teardown has started but prior to completion, the BSS transition from to the AP is occurring.

11. The AP device of claim 10, wherein to determine the procedure for handling the EPCS priority access associated with the BSS transition to the AP:

the transceiver is further configured to receive an association message for authorizing the STA for the EPCS priority access with the AP; and the processor is further configured to determine that the STA is authorized for the EPCS priority access with the AP based on locally cached authorization information for enabling verification and confirming authority during association with the AP.

12. The AP device of claim 10, wherein to determine the procedure for handling the EPCS priority access associated with the BSS transition to the AP, the transceiver is further configured to:

transmit a message to the STA indicating that the AP is unable to verify that the STA is authorized for EPCS priority access, and receive an EPCS authorization request from the STA at a later time.

13. A method for wireless communication performed by a non-AP device that comprises a STA, the method comprising:

forming a first link with a first AP of a first AP MLD and a second link with a second AP of a second AP MLD;

receiving information associated with emergency preparedness communication services (EPCS) priority access from the first AP and the second AP, wherein the STA supports the EPCS priority access;

determining whether the STA is to undergo or is undergoing a basic service set (BSS) transition from the first AP to the second AP;

when the STA is not to undergo or is not undergoing the BSS transition from the first AP to the second AP, continuing with a current EPCS priority access; and when the STA is to undergo or is undergoing the BSS transition from the first AP to the second AP, determining a procedure for handling the EPCS priority access associated with the BSS transition from the first AP to the second AP.

14. The method of claim 13, wherein:
the STA is to undergo or is undergoing the BSS transition from the first AP to the second AP, and
the method further comprises:
   determining whether the EPCS priority access is already setup prior to the BSS transition from the first AP to the second AP,
   determining whether an EPCS priority access setup procedure has started but prior to completion, the BSS transition from the first AP to the second AP is occurring, or
   determining whether EPCS teardown has started but prior to completion, the BSS transition from the first AP to the second AP is occurring.

15. The method of claim 14, wherein:
the EPCS priority access is already setup prior to the BSS transition from the first AP to the second AP; and
the method further comprises:
   determining whether the first AP and the second AP can communicate with each other; and
   based on determining that the first AP and the second AP can communicate with each other:
      using a fast BSS transition procedure so that the STA retains an EPCS enabled state during the BSS transition from the first AP to the second AP; and
      generating a resource information container for transmission to the second AP.

16. The method of claim 14, wherein:
the EPCS priority access is already setup prior to the BSS transition from the first AP to the second AP; and
the method further comprises:
   determining whether the first AP and the second AP can communicate with each other;
   based on determining that the first AP and the second AP can communicate with each other, generating a request for transferring authority to use the EPCS priority access or a request for transferring an EPCS priority access state during the BSS transition from the first AP to the second AP; and
   based on determining that the first AP and the second AP cannot communicate with each other, tearing down the EPCS priority access prior to the BSS transition from the first AP to the second AP.

17. The method of claim 14, wherein:
the EPCS priority access setup procedure has started but prior to completion, the BSS transition from the first AP to the second AP is occurring; and
the method further comprises:
   determining whether the first AP and the second AP can communicate with each other;
   based on determining that the first AP and the second AP can communicate with each other:

determining that the EPCS priority access has been torn down; and
   setting up a new EPCS priority access with the second AP after the BSS transition from the first AP to the second AP; and
based on determining that the first AP and the second AP cannot communicate with each other:
   generating a disassociation frame;
   determining that the EPCS priority access has been torn down; and
   setting up a new EPCS priority access with the second AP after the BSS transition from the first AP to the second AP.

18. The method of claim 14, wherein:
the EPCS teardown has started but prior to completion, the BSS transition from the first AP to the second AP is occurring; and
the method further comprises:
   determining whether the first AP and the second AP can communicate with each other;
   based on determining that the first AP and the second AP can communicate with each other:
      determining that the EPCS priority access has been torn down; and
      setting up a new EPCS priority access with the second AP after the BSS transition from the first AP to the second AP; and
   based on determining that the first AP and the second AP cannot communicate with each other:
      generating a disassociation frame;
      determining that the EPCS priority access has been torn down; and
      setting up a new EPCS priority access with the second AP after the BSS transition from the first AP to the second AP.

19. The method of claim 14, further comprising:
generating an association message for authorizing the STA for the EPCS priority access with the second AP; and
determining that the STA is authorized for the EPCS priority access with the second AP based on locally cached authorization information for enabling verification and confirming authority during association with the second AP.

20. The method of claim 14, further comprising:
receiving a message from the second AP indicating that the second AP is unable to verify that the STA is authorized for EPCS priority access; and
generating an EPCS authorization request at a later time.

* * * * *